United States Patent [19]

Carter et al.

[11] Patent Number: 5,001,412

[45] Date of Patent: Mar. 19, 1991

[54] ALTERNATOR STARTER

[75] Inventors: Ivor W. Carter, Grosse Pointe Woods; Frederick W. Crall, Farmington Hills, both of Mich.

[73] Assignee: Chrysler Corporation, Highland Park, Mich.

[21] Appl. No.: 240,905

[22] Filed: Sep. 2, 1988

[51] Int. Cl.[5] .................... F02N 11/04; H02K 1/00; H02K 1/22

[52] U.S. Cl. .................................. 322/10; 290/46; 310/268

[58] Field of Search .............................. 322/10–12; 310/268; 290/38, 46

[56] References Cited

U.S. PATENT DOCUMENTS

| | | | |
|---|---|---|---|
| 1,250,718 | 12/1917 | Turbayne . | |
| 1,325,677 | 12/1919 | Midgley . | |
| 2,184,236 | 11/1938 | Heintz . | |
| 4,219,739 | 8/1980 | Greenwell . | |
| 4,319,152 | 3/1982 | Van Gils | 310/268 X |
| 4,500,806 | 2/1985 | Kanayama et al. | 310/268 X |
| 4,536,672 | 8/1985 | Kanayama et al. | 310/268 |
| 4,605,874 | 8/1986 | Whiteley | 310/268 |
| 4,645,961 | 2/1987 | Malsky . | |
| 4,797,602 | 1/1989 | West | 322/10 |

*Primary Examiner*—R. J. Hickey

*Attorney, Agent, or Firm*—Mark P. Calcaterra

[57] ABSTRACT

A dual purpose alternator starter for an automotive vehicle designed to be positioned between the engine and transmission. In place of the ring gear in a conventional drive train assembly, a pair of off set magnetically permeable discs are bolted to the power shaft. These discs form an annular channel between them. A plurality of rare earth permanent magnets are mounted on the inside face of one of the discs in the channel. On the opposite side of this disc, a set of ring shaped switch contact members are mounted. Positioned stationary to the engine and within the channel is a stationary ironless stator assembly having flat copper windings embedded in an insulation matrix. These windings alternately pass from the perimeter of the disc towards the interior of the disc as each winding forms a single pass around the ring shaped disc. A stationary brush assembly mounted to ride against the set of switch rings on the rotating discs conducts electrical current, when operated as a starter motor, through the ironless stator windings to produce a torque in one direction on the power shaft thus starting the internal combustion engine. When operated as an alternator, the magnetic flux from the permanent magnets cutting the windings of the stationary stator produces electrical current within the stator.

31 Claims, 20 Drawing Sheets

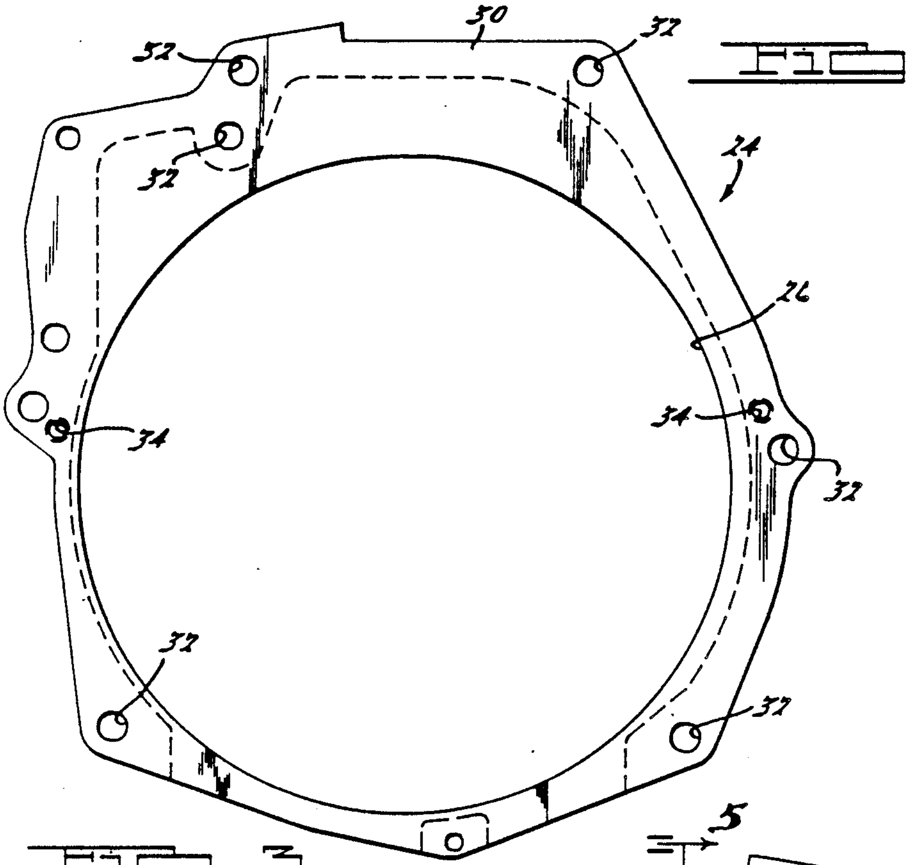
FIG. 3.
FIG. 5.
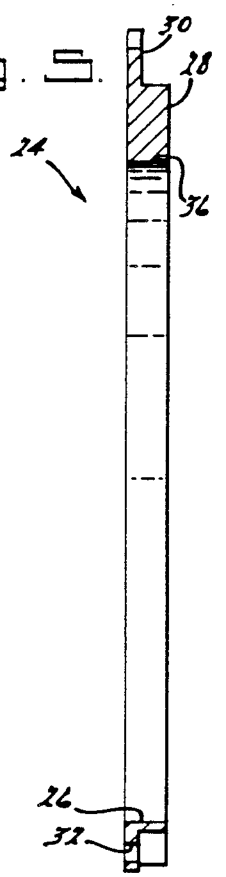
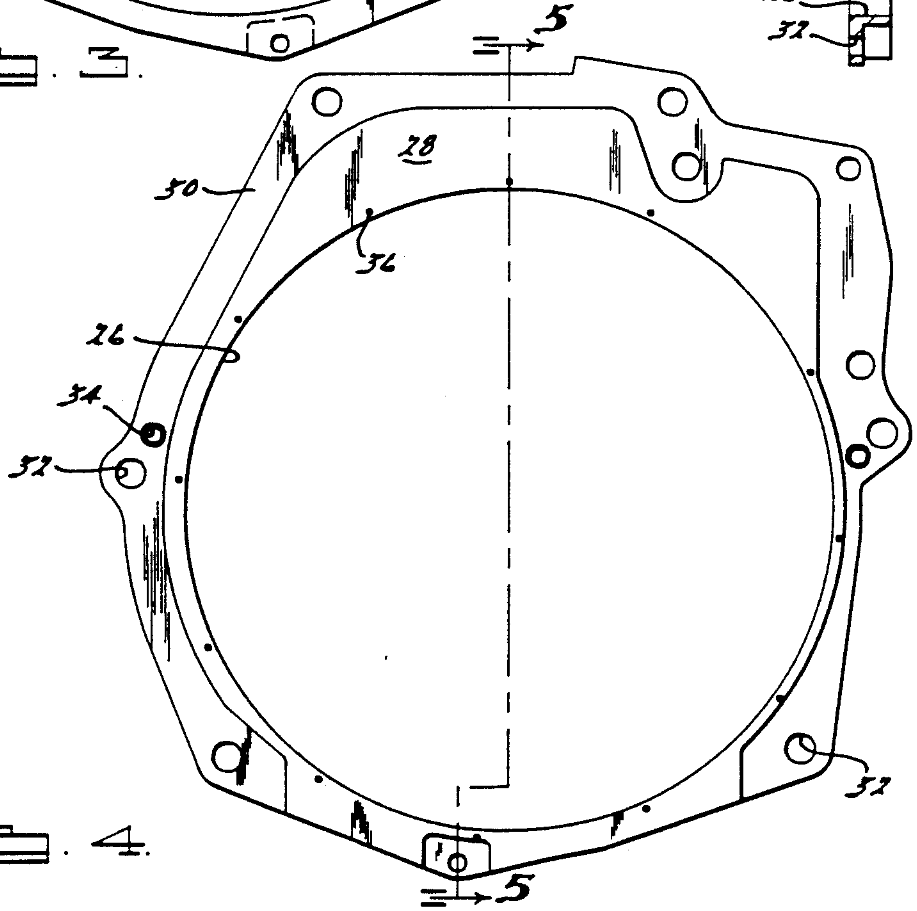
FIG. 4.

FIG. 13.
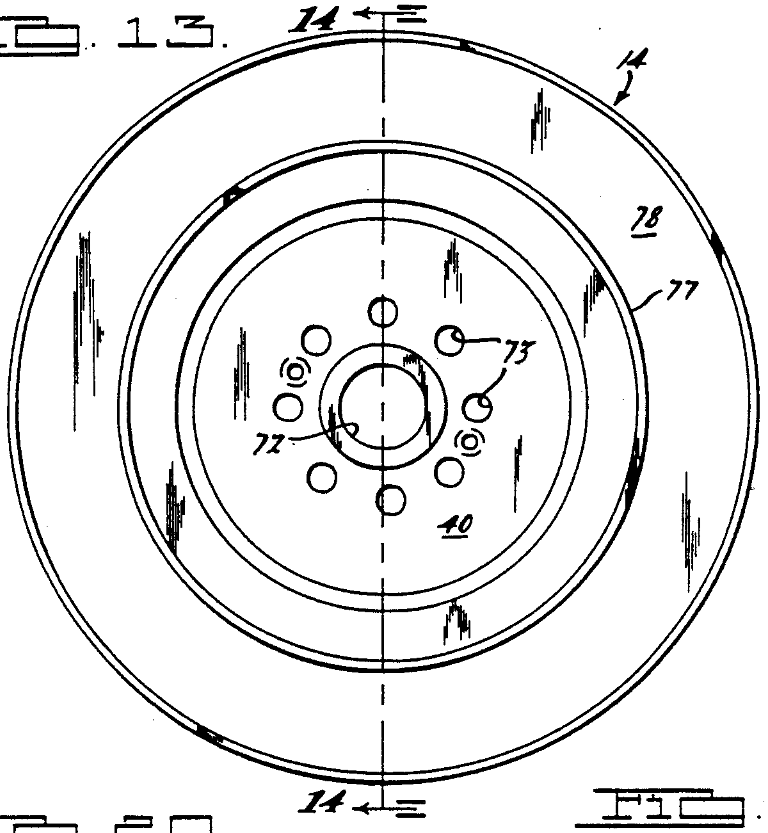
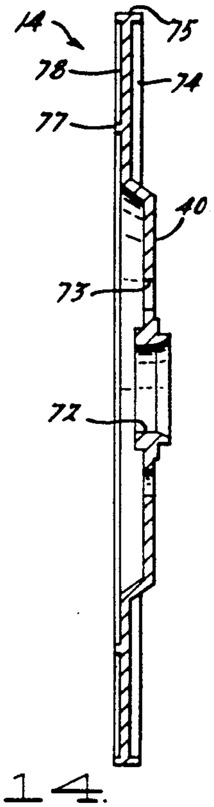
FIG. 14.
FIG. 20.
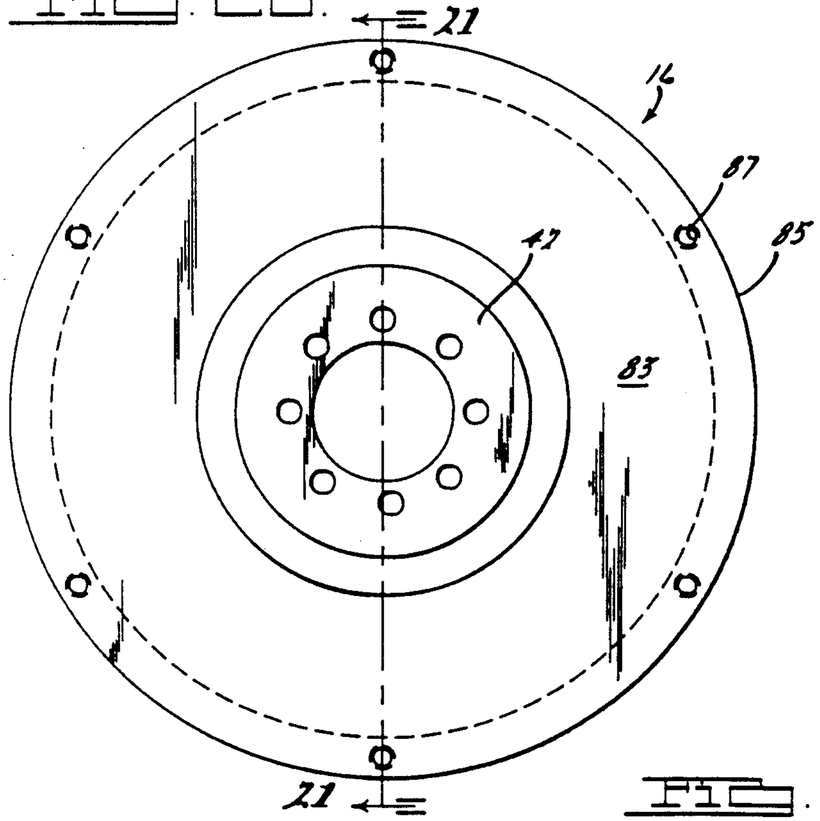
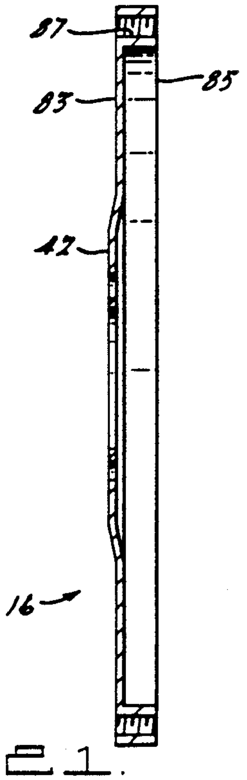
FIG. 21.

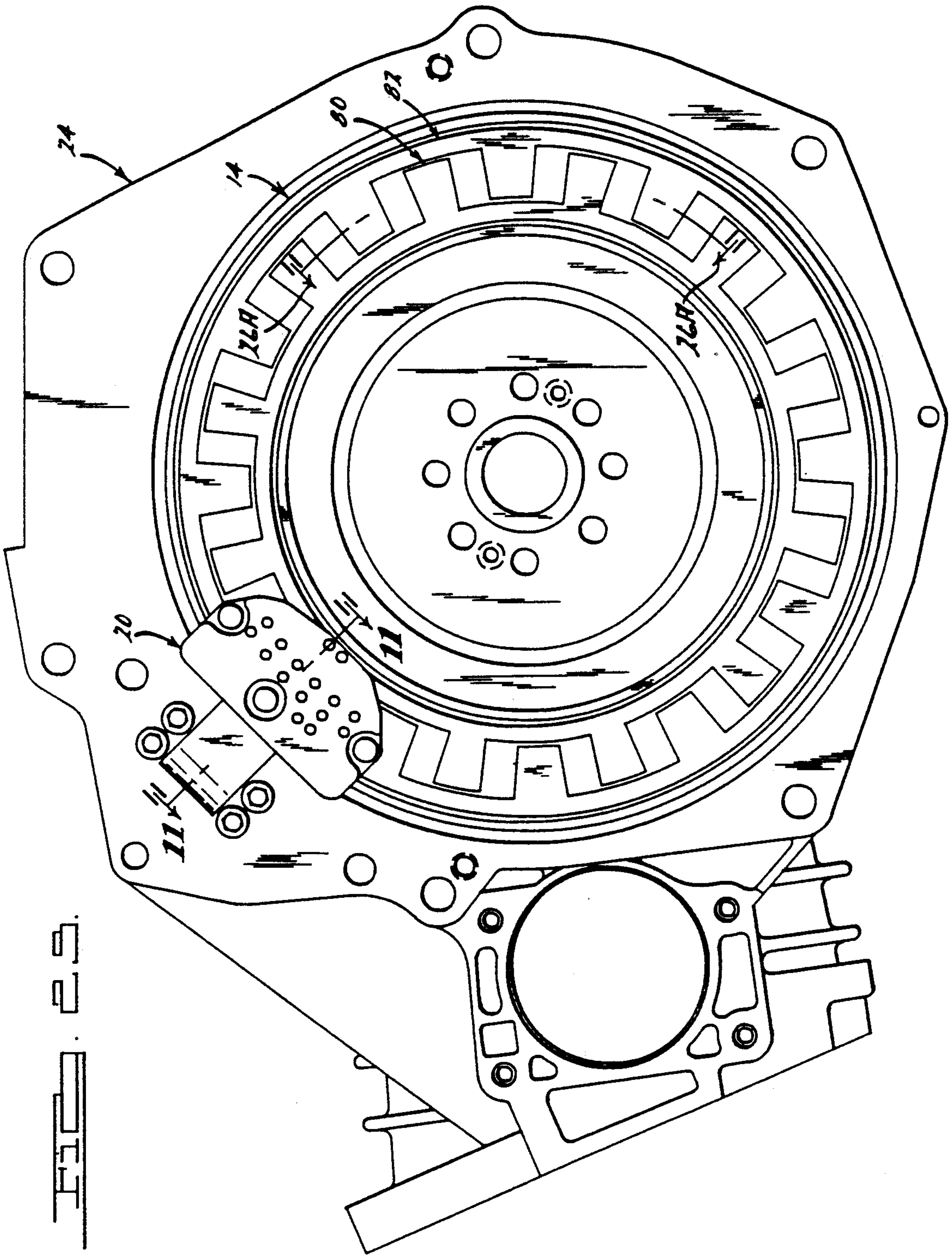
24
14
80
82
12A
12A
20
11
11

ALTERNATOR STARTER

BACKGROUND OF THE INVENTION

1. Field of the Invention

The present invention relates to the combination of an electrical motor and generator, and more particularly to a single device which performs both motor and generator functions.

2. Discussion of Related Art

In general, an electric motor can be operated as a generator and vice versa. These functions of a motor or a generator can be selected by whether power is delivered to the unit from an external source of electrical power or whether the unit is mechanically driven by an external source of mechanical energy such as an internal combustion engine in an automobile which would allow the unit to act a generator to supply electrical energy.

The subject invention comprises a structure particularly adapted for automotive applications which permits the combination of the starter motor function and the generator (generic DC or AC) or alternator (AC) function in a unique package to take advantage of the motor/generator characteristics described above. The subject invention is physically located at a position between the internal combustion engine and the transmission in the drive train of an automobile, making use of either the flywheel or the torque converter as part of the system. This is in contrast to the traditional location of a separate starter motor which is momentarily conventionally connected to the flywheel on the engine during the cranking or starting cycle, and the traditional location of a separate generator or alternator which is belt driven from the crankshaft of the engine. Since these functions of the starter and alternator are combined, the unit may be located in line between the engine and transmission thereby eliminating the requirement for being belt or gear driven and to take advantage of the fact that only one motor/generator unit will be used in place of two units as in present conventional use.

Various approaches in producing a dual purpose starter generator machine for use on motor vehicles have been developed since the early 1900's. For example, U.S. Pat. No. 1,250,718 issued to Turbanyne, Dec. 18, 1917 discloses a DC motor/generator having a rotating armature that is ring wound. When operated as a DC motor, DC current is supplied to the rotor through conventional commutator brushes.

Another starter generator is disclosed in U.S. Pat. No. 1,325,677 issued to Midgley, on Dec. 23, 1919. In this design, a conventional DC machine having a wound rotor is fitted with four brushes on the commutator ring. One of these brushes is movable away from the commutator. Movement of the movable brush serves to engage or disengage an automatic circuit as a voltage regulation device when the machine is operated as a generator. When operated as a DC motor, the movable brush effectively disengages the automatic circuit by connecting the circuit across two brushes of the same polarity.

Another example of a starter generator machine is disclosed in U.S. Pat. No. 2,184,236 issued to Heintz on Dec. 19, 1939. In this machine, in addition to conventional slip rings and brushes for energizing the windings on the rotor during generator and motor operation, the rotor is fitted with rotatable brushes. These rotatable brushes are in engagement with a stationary commutator which feeds low voltage direct current to the stator windings during the engine cranking operation. The rotating brushes are moved out of engagement with the commutator by centrifugal force as the engine crank shaft is accelerated. Thus in this design, the rotatable brushes provide the rotating stator magnetic field for operation of the device as a motor. When operating as a generator, the Heintz device produces alternating current.

In a more recent starter motor alternator disclosed in U.S. Pat. No: 4,219,739 issued to Greenwell on Aug. 26, 1980, the main rotor winding is connected in series with the main stator winding. In addition, the exciter armature winding is on the rotor, and exciter field winding is on the stator. During starter motor operation, the main rotor winding is connected in series with the starter field winding through a commutator and conventional DC brushes. During alternator operation, the brushes are lifted off the commutator and the exciter armature winding slip rings are connected to the main rotor winding.

In all of the above examples, external current is fed through a commutator to the windings on the rotor. The current carried by the conductor in the magnetic field produces a torque which causes rotation of the machine as a motor. When operated as generator or alternator, current is once again fed through a commutator or slip rings to windings on the rotor to provide excitation. These dual purpose motor generator sets have a variety of disadvantages. In any conventional dual purpose machine, certain sacrifices must be made in order to accommodate both generator and motor functions in a single device as compared to single purpose machines. For example, previous and conventional motor generator designs for use in a motor vehicle such as an automobile or an aircraft have a low power to size ratio, are relatively costly, and have a high length to diameter ratio. In fact, it has therefore been impractical to develop a combined motor generator design for use in automobiles.

The dual purpose machine concept has primarily been utilized in aircraft design. However, these machines are extremely complex to manufacture with resultant high cost. Because of the power requirements, overall size, and complexity of a conventional motor generator or dual starter motor alternator of conventional design, automotive vehicles utilize separate starter motors and alternators.

The disadvantages of conventional starter motor designs include very high noise during operation, a low electromechanical efficiency, relatively large size requirements, high motor weight and battery size requirements, and low reliability. In addition, the necessity for having a separate alternator increases the overall space allocation to these functions.

It is an object of the present invention to provide a motor generator unit having a flat nonmagnetic ironless stator and a magnetic flux return path fixed with respect to the magnets.

It is another object of the present invention to provide an alternator starter which replaces the ring gear located between the engine and transmission of a conventional motor vehicle.

It is another object of the present invention to provide an alternator starter adaptable to conventional drive train designs.

It is another object of the invention to provide an alternator starter having a thin, nonmagnetic ironless stator assembly. An ironless stator assembly means that there are no iron losses in the stator. Only IR losses are present. Therefore total losses are minimized.

It is a further object of the invention to provide an alternator starter having no bearings, the alternator starter being integral with the power shaft of the internal combustion engine.

It is a further object of the invention to provide an alternator starter for an automotive vehicle having a high efficiency per unit weight ratio and a high output per unit weight ratio.

It is a still further object of the invention to provide an alternator starter in an automotive vehicle which generates no starting noise, has high reliability, high efficiency, and requires a minimal amount of space within the conventional drive train assembly.

It is a still further object of the present invention to provide an alternator starter having a twenty four pole design for sensing the rotational position of 2, 4, 6, 8 or 12 cylinder engines.

It is a still further object of the invention to provide a stator winding structure comprised of flat metal stampings in a single winding structure.

SUMMARY OF THE INVENTION

The alternator starter according to one embodiment of the present invention is primarily designed to replace the ring gear which is positioned between the conventional engine and a transmission in a typical automotive drive train assembly. The invention may also be designed to be positioned about the power shaft on any internal combustion engine. Other embodiments may be designed for use as an integral motor generator unit wherever space is at a premium. The invention as described below illustrates the important features of the invention.

In a conventional engine-transmission drive train assembly, the ring gear is removed. Bolted to the end of the crankshaft is a pair of offset magnetically permeable disc shaped metal plates. When bolted together at the center to the crankshaft, these plates form an annular channel between them.

One plate has a set of ring shaped switch contact members mounted on one side of the plate. On the other side of this plate are positioned a series of flat rare earth metal alloy permanent magnets. The outer periphery of the other plate is in turn bolted to the torque converter cover of a conventional automatic transmission torque converter.

Disposed between the two plates, within the channel, and mounted stationery to the vehicle engine is an ironless three phase stator assembly. The stator assembly is a generally ring shaped molded disc structure having a plurality of flat windings made from copper sheet stampings embedded in an insulation matrix. These flat copper stampings are insulated from one another and positioned in a stacked relationship within the molded stator assembly. Each winding forms a single pass around the ring shaped disc and each winding undulates from the outer diameter of the ring shaped disc to the inner diameter as it forms its single pass. Several windings are connected at their ends in series to form each of the phase windings of the three phase stator assembly.

The unique construction of the ironless stator windings using nonmagnetic materials keeps the axial thickness of the stator as small as possible. The use of these nonmagnetic materials plus, and more importantly, the absence of iron losses and bearing losses, and the absence of a need for a separate enclosure due to the utilization of the bearings and enclosure provided by the engine and transmission, provides a much higher efficiency and output per unit weight ratio compared to conventional starters and alternators. Because there is no iron in the stator assembly, no iron losses are developed in the alternator starter.

When operated as a starter motor, a sensing mechanism dictates which of the triplex stator windings should be energized and in what sequence in order to produce a constant torque on the shaft as the disc containing the permanent magnets rotates. The magnetic flux path and direction of the magnetic field from the magnets through the air gap between the plates and through the opposite plate and back to the opposite side of the magnets remains constant and does not change direction as with conventional motors and generators. Consequently, hysteresis and eddy current losses are minimized and heating in the plates is minimized.

A variety of sensing mechanisms may be utilized. For example, an optical sensor may be utilized to sense position of appropriate marks on the disc as it rotates. Any suitable mechanism that is correlated to the position of each magnet segment during disc rotation may be utilized to trigger or appropriately energize the stator windings. For example, in one of the preferred embodiments, a set of brushes comprising a brush assembly and a switch ring mounted on the rotating disc is utilized to switch the current within each set of phase windings in the proper order. Current is fed from the vehicle battery through the switch ring and contacts, and appropriate pairs of brushes to and from the appropriate windings so as to produce a constant torque on the crankshaft thus causing rotation of the crankshaft to start the vehicle engine.

Once the vehicle engine is started, the brush assembly is lifted off the switch plate to minimize brush wear as the brush assembly is no longer needed.

When operated as an alternator, sensing the relative positions of the magnets is no longer required. Rotation of the permanent magnets fixed to the disc on the vehicle crankshaft causes a rotating flux which cuts the stationary stator windings. This relative motion produces an EMF in the stator proportional to the number of lines of flux cut, the number of conductors, and the speed of relative motion. Since the number of conductors and the total flux is constant, the induced EMF will vary proportional to the speed of rotation.

The stator windings may be connected in three phase delta or wye connection or used independently. One of the three phase windings may be utilized to produce DC output to charge the vehicle battery as well as energize appropriate DC circuits within the vehicle. The other two phase windings may remain unused or may be utilized for other purposes such as to produce a regulated AC output for various devices requiring an AC supply. Sufficient output is produced by the present invention so that a single phase may be utilized to provide all DC requirements of a motor vehicle as presently in use.

In other words, present design requirements in automobiles are within the output production capability of a single phase winding of an alternator starter according to the present invention. Alternatively, all three phases of the stator may be coupled via a full wave rectifier circuit into an appropriate voltage regulation circuit to provide total DC output. In this case, the achievable DC current output far exceeds the electrical requirements in a typical automobile.

A related invention is described in the commonly assigned U.S. patent application Ser. No. 07/240,871 entitled "Flat Stator Winding For Alternator Starter" filed on Sept. 2, 1988 and hereby expressly incorporated by reference.

Other embodiments of the invention are envisioned wherein the stationary components are reversed. In other words, the ironless stator may be rotated with the magnets remaining stationary with respect to the engine.

BRIEF DESCRIPTION OF THE DRAWINGS

FIG. 3 is an engine end view of the brush and stator mounting plate;

FIG. 4 is a transmission end view of the brush and stator mounting plate;

FIG. 5 is a sectional view of the brush and stator plate shown in FIGS. 3 and 4 taken along the line 5—5 in FIG. 4;

FIG. 13 is an engine end view of the switch and magnet plate according to the present invention;

FIG. 14 is a sectional view of the switch and magnet plate taken along line 14—14 in FIG. 13;

FIG. 20 is an engine end view of the combination magnetic return and torque converter mounting plate according to the present invention;

FIG. 21 is a sectional view of the transmission mounting plate taken along the line 21—21 in FIG. 20;

FIG. 25 is a view from the engine end of the completed assembly according to the present invention shown in FIG. 1;

DETAILED DESCRIPTION OF THE PREFERRED EMBODIMENT

Figure 1:
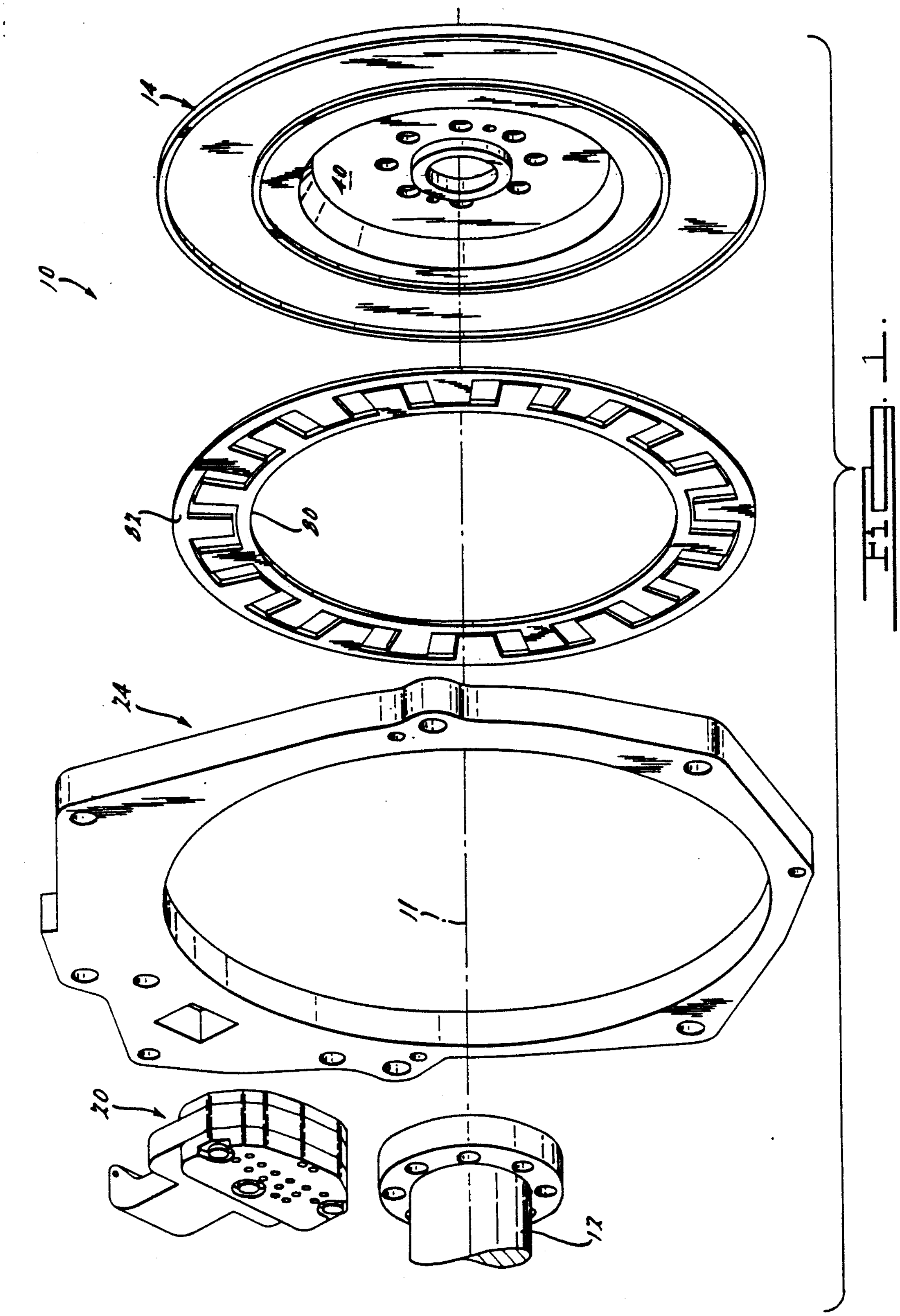
FIGS. 1 and 2 present an exploded perspective view of the alternator starter according to the present invention showing the various parts and subassemblies disposed between an engine and transmission of a motor vehicle.
Figure 2:
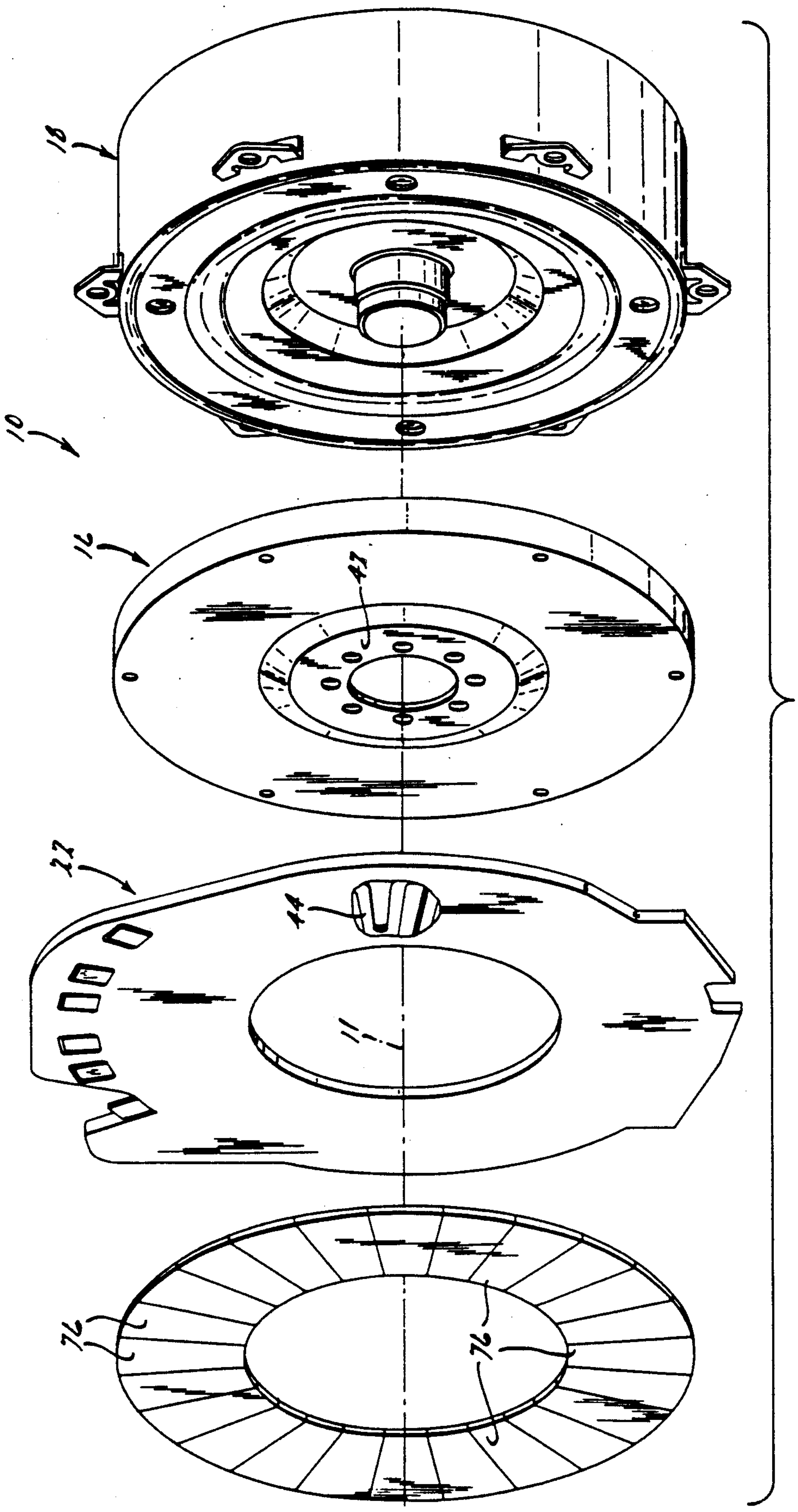

Referring now to the drawings, FIGS. 1 and 2 show an exploded view of the alternator starter according to a preferred embodiment of the present invention. The alternator starter 10 is located between the vehicle engine and transmission. Although the engine is not shown, it is located on the left end of the central axis 11 in FIG. 1. The transmission, also not shown, is oriented to the right end of the central axis 11 in FIG. 2. The engine power shaft, in this embodiment crankshaft 12, is bolted to switch and magnet mounting plate 14 and combination magnetic return and torque converter mounting plate 16. Torque converter mounting plate 16 is in turn bolted to torque converter cover 18. These two plates 14 and 16 therefore rotate with the engine crankshaft.

Brush assembly 20 is mounted on and stator winding assembly 22 is mounted to brush and stator mounting plate 24. Brush and stator mounting plate 24 is bolted to the engine block and mounted in fixed position with respect to the transmission housing. Therefore stator winding assembly 22 remains stationary when plates 14 and 16 rotate with crankshaft 12 during engine operation.

Brush and stator mounting plate 24 serves to provide a support for brush assembly 20 and nonmagnetic stator winding assembly 22 and provides a space to mount the remainder of the alternator starter components between the engine and transmission. The necessity for this mounting plate 24 is to adapt the subject invention (the alternator starter) to an existing conventional engine and transmission combination. However, if the engine and transmission were redesigned with the subject invention in mind, they would likely take on a different shape to accommodate the subject invention in such a way as to eliminate the necessity for brush and stator mounting plate 24. Since such development has not yet occurred, the brush and stator mounting plate 24 is provided and allows a communication link between brush assembly 20 and the remainder of the alternator starter assembly.

FIGS. 3, 4 and 5 show various views of the brush and stator mounting plate 24. Mounting plate 24 is a disc shaped, generally flat metal or plastic plate having a central circular bore 26. Plate 24 has a thick central portion 28 and a thin flange portion 30 having a plurality of spaced apart holes 32 through which mounting bolts (not shown) are passed for securing the plate and the transmission housing to the engine block. Guide holes 34 and 36 facilitate alignment during assembly.

In a new design of an engine and transmission combination, brush and stator mounting plate 24 would not be required. Stator winding assembly 22 could be appropriately accommodated within either the engine or the transmission housing. Therefore the brush and stator mounting plate 24 as shown in FIGS. 3, 4 and 5 is only utilized when the present invention is adapted for use in a vehicle of conventional design.

Brush and stator mounting plate 24 and stator winding assembly 22 may be designed and constructed as an integral one piece unit using a suitable molding process. As shown in this preferred embodiment however, brush and stator mounting plate 24 is made of metal such as aluminum and the body of stator winding assembly 22 is made generally of a non-metallic molded material such as a glass and resin matrix.

Figure 6:
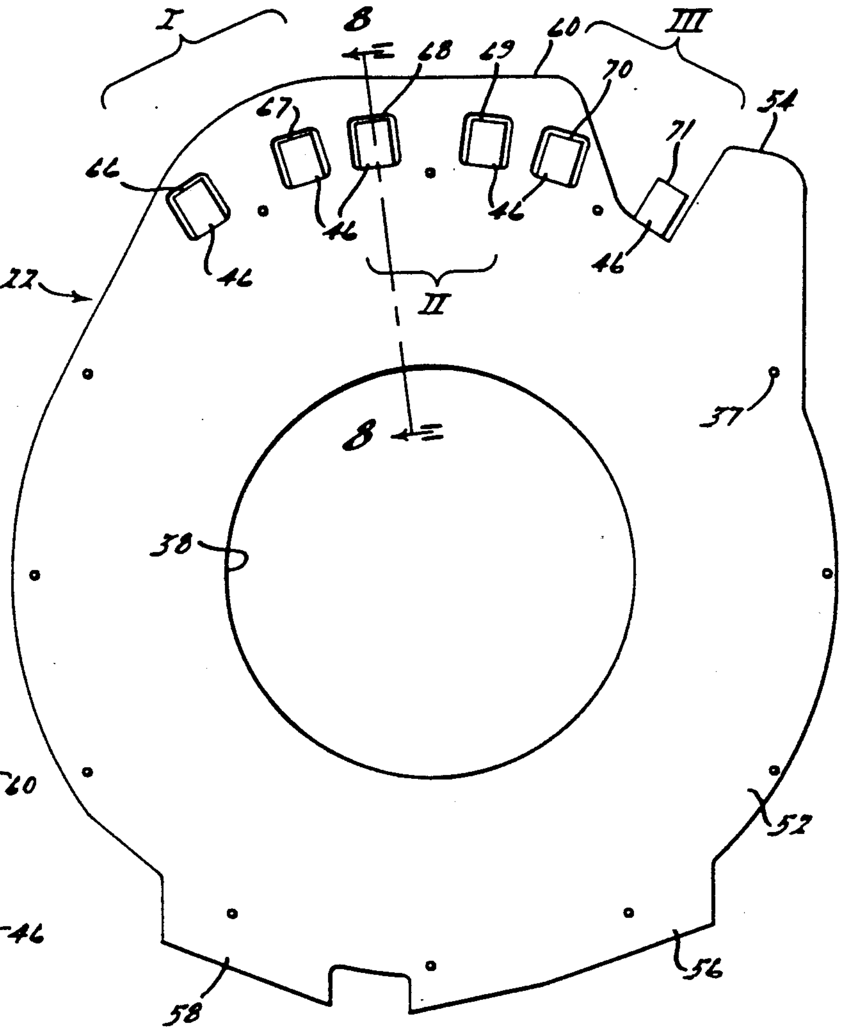
FIG. 6 is a transmission end view of the stator assembly.
Figure 7:
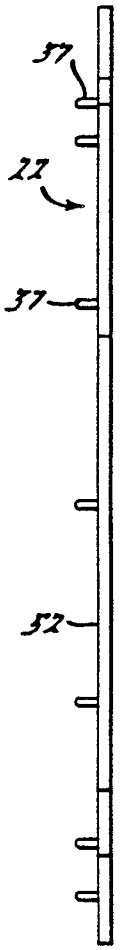
FIG. 7 is a side view of the stator assembly shown in FIG. 6.
Figure 8:
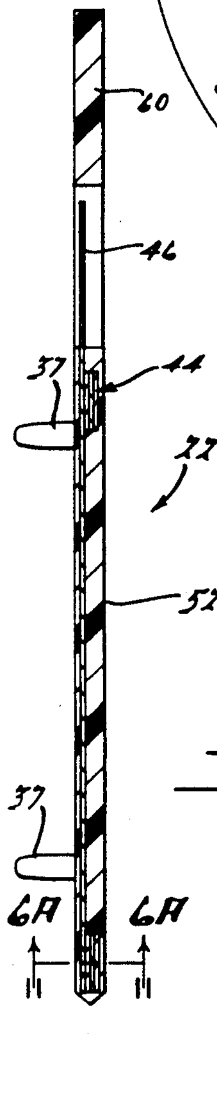
FIG. 8 is a sectional view taken along the line 8—8 in FIG. 6.

Stator winding assembly 22, shown in FIGS. 6, 7, and 8 is affixed to the brush and stator mounting plate 24 between the external housing of the transmission and engine so as to be stationary. Locating pins 37 fit into holes 36 and serve to align assembly 22 on plate 24. Stator winding assembly 22 has a central bore 38. Bore 38 is slightly larger in diameter than central disc portions 40 of switch and magnet mounting plate 14 and disc portion 42 of combination magnetic return and torque converter mounting plate 16. Since the disc portions 40 and 42 of plates 14 and 16 are bolted to crankshaft 12, the bolted assembly may therefore be rotated freely through the center of stator winding assembly 22.

Stator winding assembly 22 is comprised of one or more sets of flat conductive windings 44. Windings 44 may be formed by a wire electrical discharge machine (EDM) cutting process, a stamping process, or other suitable process. Each winding 44 is cut out or stamped from a flat conductive sheet such as flat copper material of about 0.016 inches in thickness. The flat conductor windings 44 are then coated with a thin insulation layer.

Figure 9:
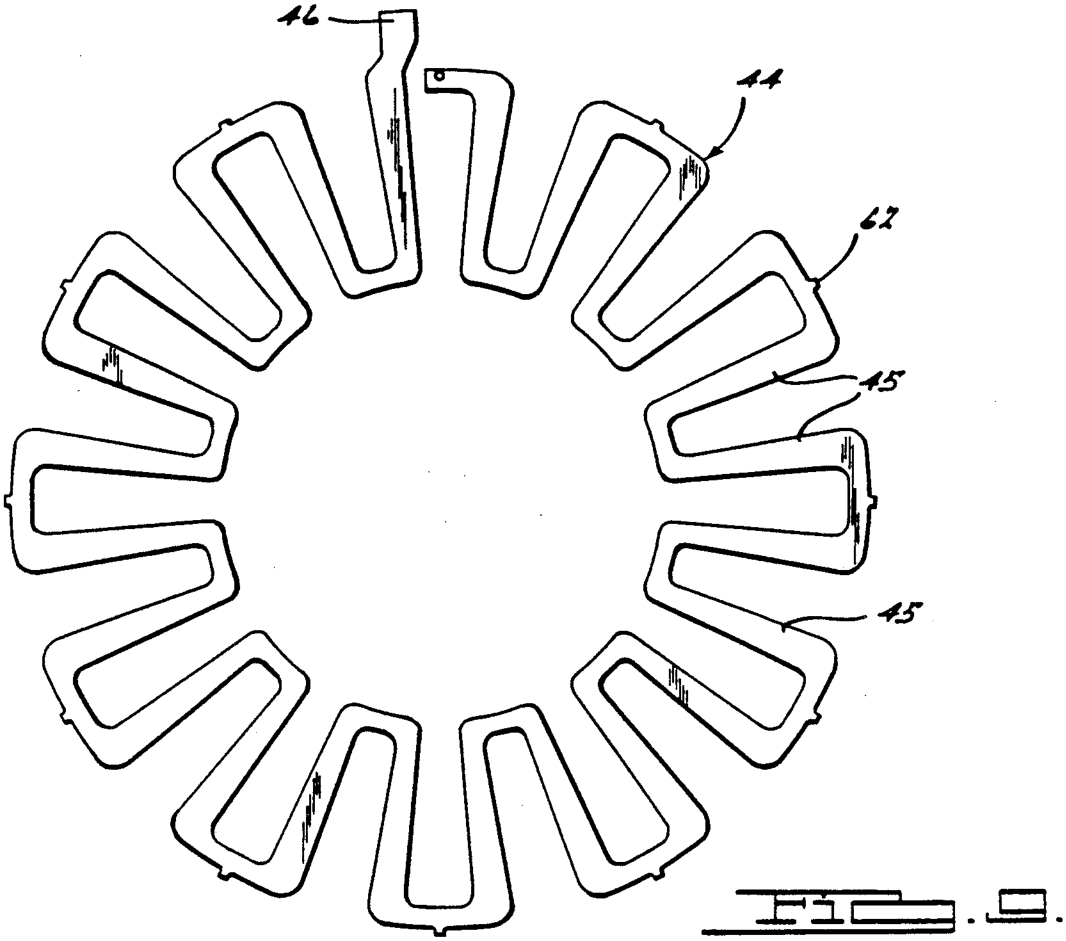
FIG. 9 is a plan view of a single stator winding according to the present invention.
Figure 11:
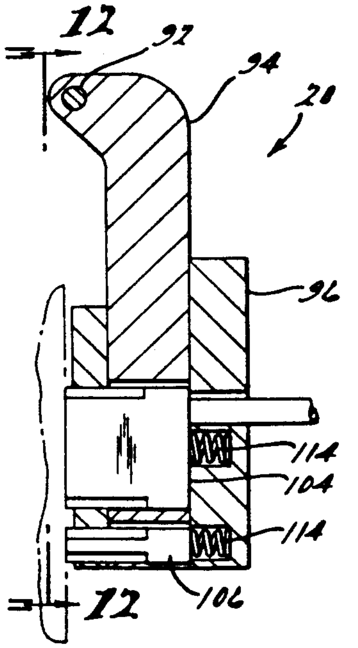
FIG. 11 is a sectional view of the brush assembly shown in FIGS. 1 and 25 taken along the line 11—11 in FIG. 25.
Figure 12:
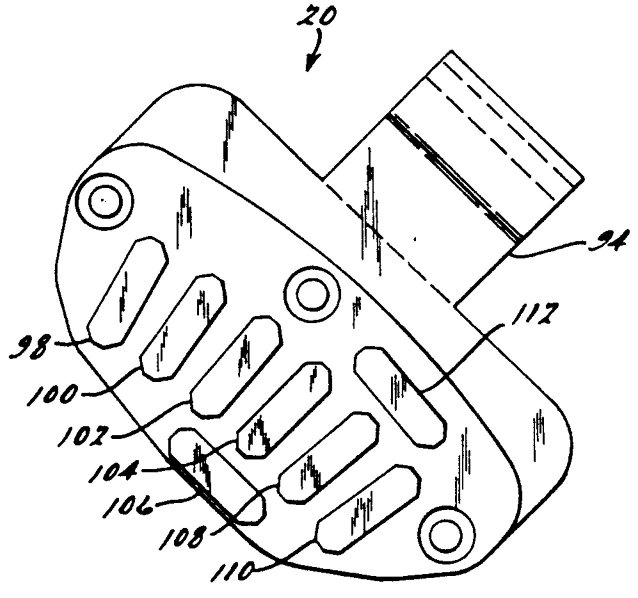
FIG. 12 is a bottom perspective view of the brush assembly shown in FIG. 11 taken along the line 12—12.

Each flat conductor winding 44 has a planar, serpentine ring shape. The specific shape of each flat conductor winding 44 is illustrated in FIG. 9. Each winding has twenty four straight portions 45 passing radially from the outer perimeter of the ring to the inner perimeter of the ring and vice versa as the winding undulates in a serpentine fashion around the ring. These straight portions 45 are equiangularly spaced and the number of straight portions is dictated by the number of magnets in the design. In the preferred embodiment, herein described, there are twenty four straight portions and twenty four magnets.

Each flat conductor winding 44 has two ends forming connecting tabs. One external connecting tab 46 is designed to connect to a wire coming from brush holder assembly 20. The same tab 46 is also connected to an alternator diode and SCR assembly to be more fully described below.

Figure 10:
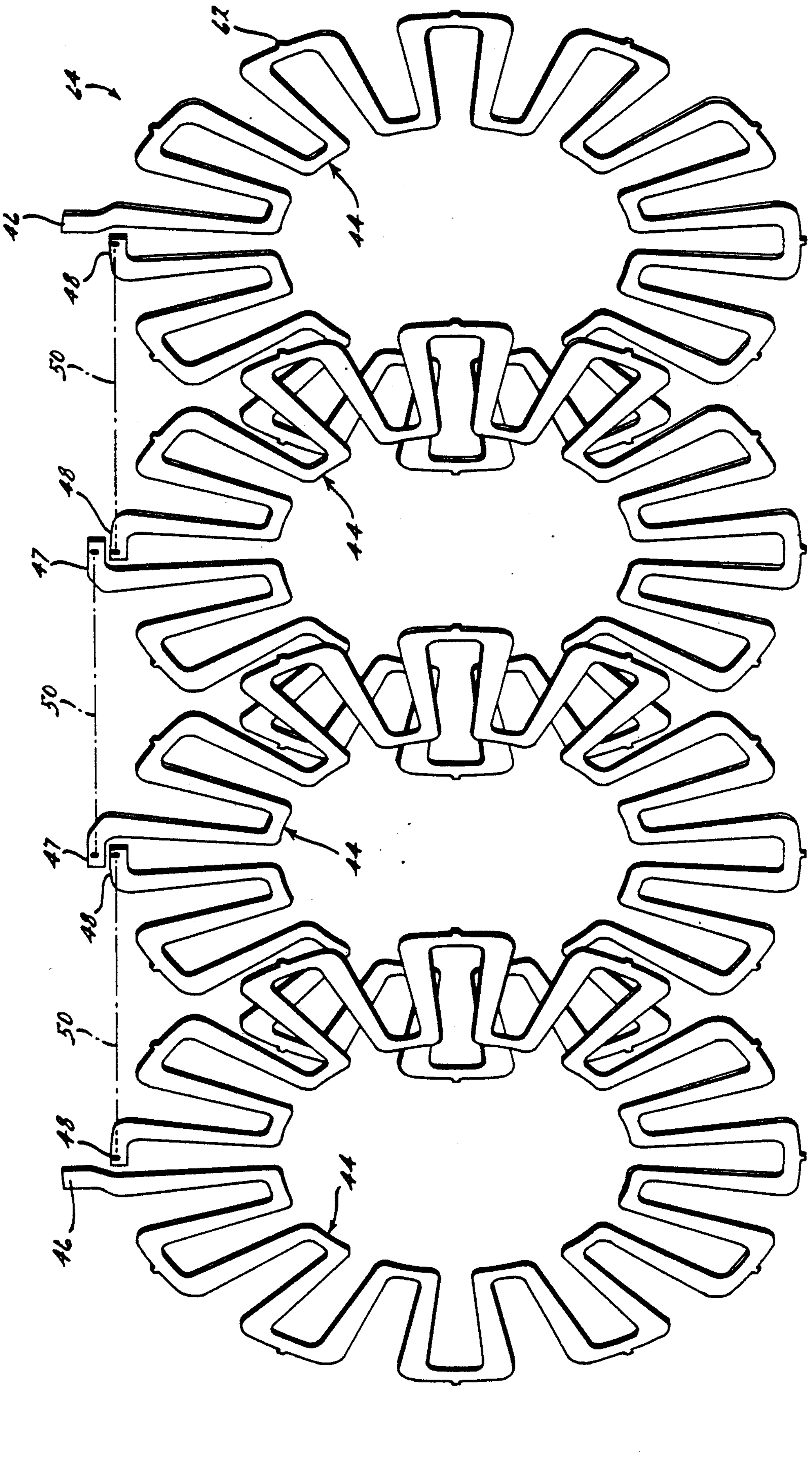
FIG. 10 is an exploded view of a single phase set of a stator winding assembly according to the present invention.

With reference to FIG. 10, internal tabs 47 and 48 provide a mechanism to interconnect the ends of flat conductor winding 44 with other flat conductor windings 44 in series to provide additional layers of winding as shown by dashed lines 50 in FIG. 10. Once the additional winding layers are interconnected, the last of such layers will terminate with another external tab 46 for communication with the brush assembly, or alternator starter output assembly.

A set 64 of windings 44 is formed by placing a plurality of windings 44 in symmetrical stacked relationship one on top of another, each winding 44 forming a layer insulated from one another by a resin, fiber, or plastic type insulative material. The type of insulation is a design choice depending on the amount of insulation required for any particular design.

The number of flat copper windings 44 in a set is a function of the load demands of the alternator starter. It is envisioned that a 24 volt DC system will have four layers of flat conductor windings 44 in each set, one set per phase for a three phase machine to provide the torque required for cold starting a typical engine.

When completely assembled, the entire stator winding assembly has an accumulative build up of insulative material 52 (FIGS. 6, 7, 8) which provides rigidity to the stator winding assembly. Also formed with the insulative material are mounting flanges 54, 56, and 58. The shapes are design choices and may vary with the particular design or manufacturer. Tab pad 60, facilitating external wire connection, is similarly formed during the same process with the same insulative material.

The four layers for each set 64 are constructed so as to be superimposed upon each other so that the windings of each set are all in stacked alignment. Projections 62 (FIG. 10) are provided in the outer edges of the flat conductor winding 44 to facilitate this alignment during manufacture. Other mechanisms to provide superimposed alignment of the layers of flat copper windings are also possible.

The stacked plurality of flat conductor windings 44 shown in FIG. 10 provides a single phase winding set 64. When more that one electrical phase is desired, an additional set 64 of layers of flat conductor winding 44 is stacked on the first winding set 64. In the preferred embodiment described, three sets 64 are provided, one per phase, for three phase application. It should be appreciated that the selection of the number of straight portions 45 and the number of flat windings 44 in a set is a design choice which is dictated by traditional rotating machinery physics.

In the embodiment shown, specifically in FIG. 6, the stator assembly 22 comprises three phase windings.

Each phase comprises a single phase winding set 64, also shown in FIG. 10, having two tabs 46 adjacent one another. When assembled as shown in FIG. 6, each winding set 64 is physically offset by 20 degrees of rotation. Accordingly, tab pairs 66 and 67, 68 and 69, 70 and 71 correspond to single phase winding sets 64 for phases I, II, and III in a three phase machine. Thus the straight portions 45, of the four twenty four turn windings 44 are spaced from the adjacent phase winding straight portions 45 by an arc of about 5 degrees.

The width of the straight portions 45 of each winding is slightly less than an arc of 5 degrees so that the space between adjacent windings, when viewed axially, is minimized and no overlap exists. This ensures that conductor surface is maximized to minimize winding resistance. In addition, this construction places a maximum amount of conductor winding within the path of the magnetic flux emanating from the rotating permanent magnets 76.

Figure 6A:
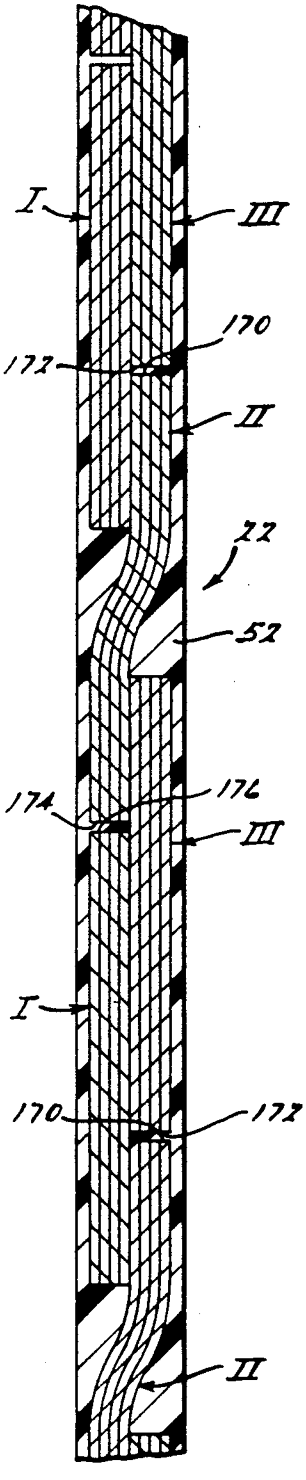
FIG. 6A is a partial radially outward sectional view of the stator assembly taken along the line 6A—6A in FIG. 8.

The thickness of a winding set is dictated by the total thickness of the four coated windings. In the embodiment shown, the axial thickness of the assembled stator assembly is never more than two set thicknesses as illustrated in the enlarged partial sectional view of FIG. 6A. Construction in this fashion minimizes the axial thickness of the overall assembly while at the same time maximizing the amount of straight portion surface area to be cut by the magnetic flux which passes the stator assembly. This arrangement maximizes the available output of the machine. As can be seen in FIG. 6A, the arcuate portion of the phase II winding is bent so as to alternate overlapping or abutting the alternate phase windings. Edge 170 of the phase II winding set abuts edge 172 of the phase III winding set when phase II is adjacent phase I. Similarly, the opposite edge 174 of the phase II winding set abuts edge 176 of the phase I winding set when phase II is adjacent the phase III winding. As viewed from the outside, radially inward, the phase II winding similarly alternates overlapping and abutting relationships.

In the preferred embodiment, the insulation coated windings are placed in a glass and resin matrix which, when hardened, forms the completed stator winding assembly. As shown in FIG. 6A, the inner and outer arcuate portions of each winding are bent as described above only in the phase II winding set. The phase I and phase III winding sets do not require bending and hence are completely flat.

Switch and magnet mounting plate 14 is a generally circular disc shaped plate of magnetically permeable material as shown in FIGS. 13 and 14. Plate 14 has a centrally disposed bore 72 and eight holes 73 symmetrically spaced around the bore for mounting to the end of crankshaft 12 via eight mounting bolts. One side of plate 14 includes ring shaped magnet race 74 around the outer portion of switch and magnet mounting plate 14 for receiving and holding in place twenty four flat, generally pie piece shaped magnets 76.

Circular rim 75 defines the outer boundary of magnet race 74. Disc portion 40 defines the inner boundary of magnet race 74. Each magnet 76 covers an arc of 15 degrees and is made of a magnetic alloy material such as neodymium, iron, and boron. Each magnet 76 is a permanent rare earth magnet so formed and positioned as to present a north or south pole against the surface of magnet race 74 on switch and magnet mounting plate 14 and the opposite pole facing outward. Each adjacent magnet is positioned with opposite polarities against magnet race 74. Consequently, when all 24 magnets 76 are mounted on plate 14, a ring shaped magnetic disc having alternating magnetic polarities on its face is formed.

On the opposite side of switch and magnet mounting plate 14 to magnet race 74 is a switch race 78. Circular rim 75 and circular ridge 77 define the outer and inner boundaries respectively of switch race 78. Switch race 78 is designed to accept inner switch contact ring 80 and outer switch contact ring 82 in a nested pattern. Race 78 is coated with an insulative resin and filler 91 onto which the inner and outer rings are installed.

Figure 15:
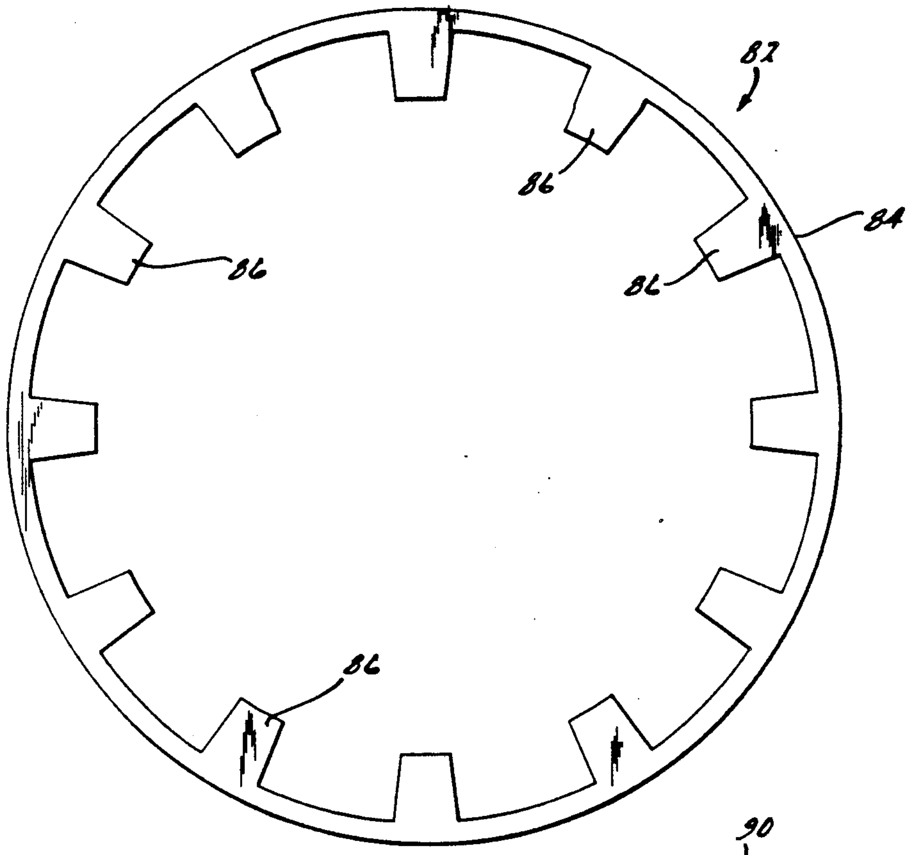
FIG. 15 is a view of the outer switch contact ring.
Figure 16:
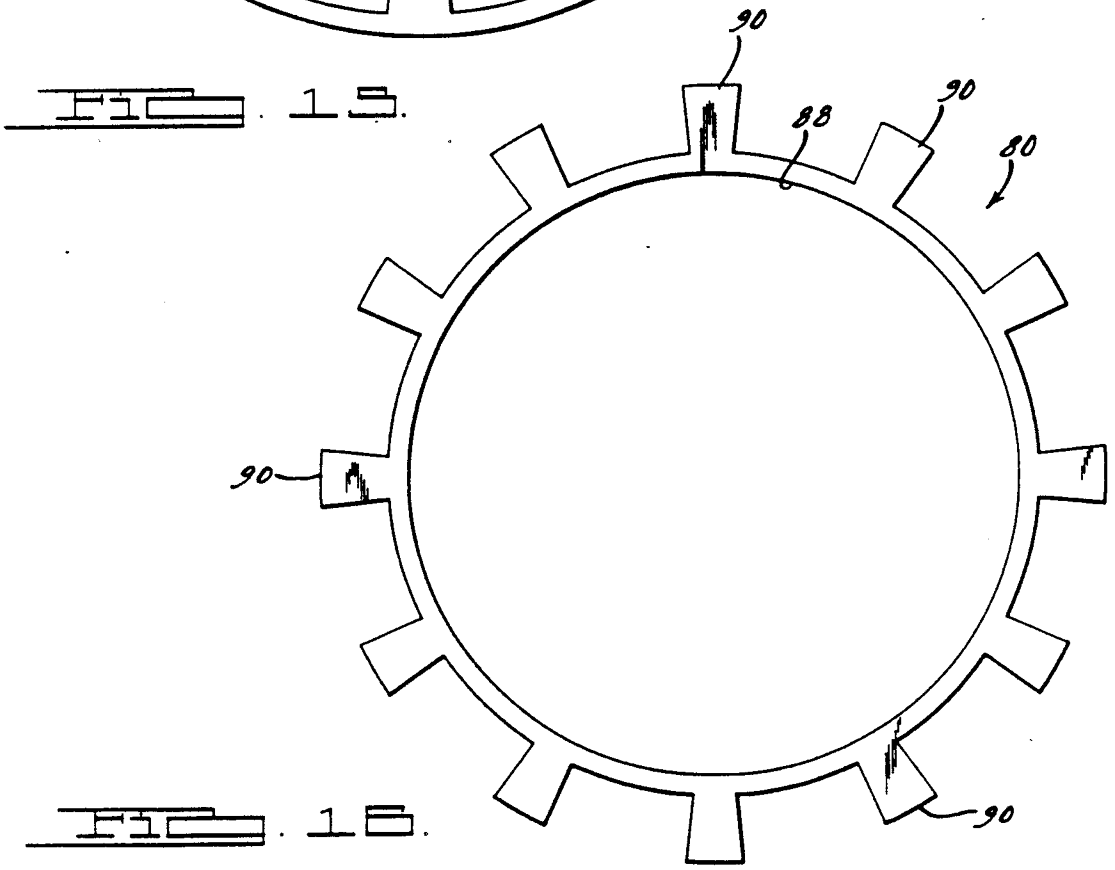
FIG. 16 is a view of the inner switch contact ring.

Inner and outer switch rings 80 and 82 are shown in FIGS. 16 and 15 respectively. Outer switch ring 82 is comprised of a circular, flat ring portion 84 of copper or other highly conductive metal having contact tabs 86 projecting toward the center of the ring portion 84. Inner switch ring 80 comprises ring shaped portion 88 of copper or other highly conductive metal having outwardly directed contact tabs 90 which project radially outward from the ring portion 88. Inner switch ring 80 and outer switch ring 82 are essentially concentric copper rings having projections 86 and 90 which are interposed and nested in a complimentary fashion when mounted in switch race 78 on plate 14. Inner switch ring 80 and outer switch ring 82, when mounted in switch race 78, are installed such that neither switch ring is in contact with the other and such that neither ring is in electrical contact with switch and magnet mounting plate 14. Insulating filler 91 is solidified between tabs 86 and 90 so as to present a smooth flat surface on the assembled switch plate surface.

Inner and outer switch rings 80 and 82 may be made from a sheet of copper in a stamping. This stamping may leave projections 86 and 90 attached to ring portions 88 and 84 respectively via slightly raised ridge portions formed during the stamping operation. A stamping thus formed then retains inner and outer switch rings 80 and 82 in the proper spacial relationship so that when the stamping is embedded in the insulative resin and filler 91 in switch race 78, this spacial relationship is maintained. Upon solidification of the insulative resin the ridges may be machined off thus separating the projections 86 and 90 from ring portions 88 and 84 respectively and leaving the two inner and outer switch rings in correct alignment and insulated from each other, and presenting a smooth, flat surface on plate 14, for proper brush contact.

Traditionally, commutators are utilized to direct electrical current from an external source to windings positioned on a rotor, or conversely to extract electrical current produced in a rotating conductor. In the present invention this is not the case. Inner switch ring 80 and outer switch ring 82 are utilized in the present invention to provide synchronized switching of DC current supplied via the brush assembly 20 to the stationary winding sets 64 described above. Thus the inner and outer rings 80 and 82 are not utilized for true commutation in the normal sense.

Since inner and outer switch contact rings 80 and 82 provide the appropriate timing for energizing each winding set 64 in stator assembly 22, there are several alternative means for performing this function. For example, a hall effect device could be utilized to trigger solid state switches to externally direct current to the winding sets 64 in stator assembly 22. In a similar fashion, an optical pickup such as an LED device could be utilized to perform the same function. In the preferred embodiments described herein, a switch plate and corresponding brush assembly are utilized as the most cost effective current design. It should be noted however that the present invention is not limited to the preferred embodiments thus described.

Figure 17:
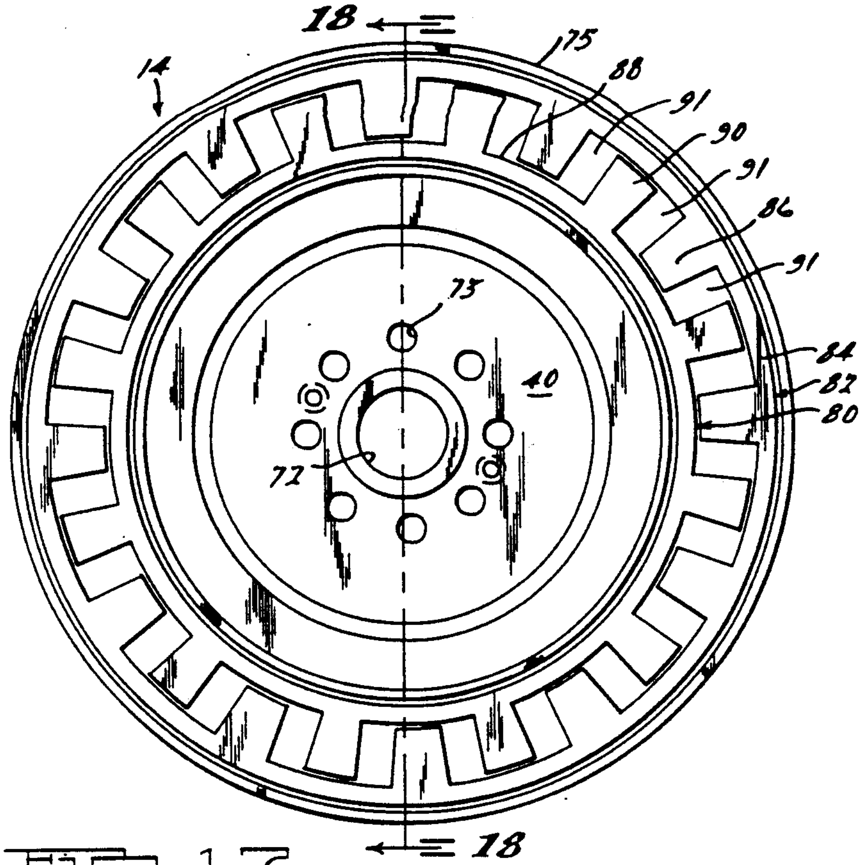
FIG. 17 is an engine end view of the assembled switch plate according to the present invention.
Figure 18:
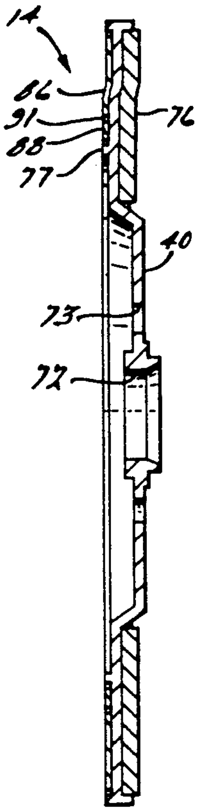
FIG. 18 is a sectional view of the assembled switch plate taken along the line 18—18 in FIG. 17.
Figure 19:
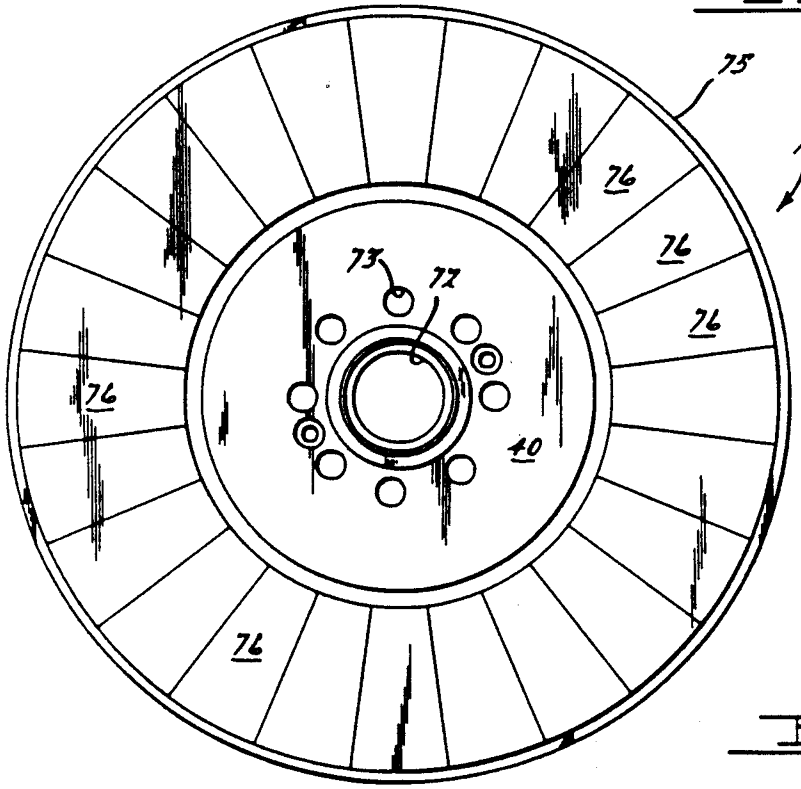
FIG. 19 is a transmission end view of the assembled switch and magnet plate according to the present invention.

An assembled view of switch and magnet mounting plate 14 with magnets 76 and inner and outer switch plates 80 and 82 in place is shown in FIGS. 17, 18, and 19. The centralized disc portion 40 of switch and mounting plate 14 is axially offset so as to position central disc portion 40 against central disc portion 42 of combination magnetic return and torque converter mounting plate 16. The outer flange portion 83 (FIGS. 20 and 21) of torque converter mounting plate 16 is therefore positioned adjacent and parallel to magnets 76 when crankshaft 12 is bolted together with disc portions 40 of switch and magnet mounting plate 14 and disc portion 42 of torque converter mounting plate 16. When assembled, stator winding assembly 22 is thus sandwiched between and spaced from switch and magnet mounting plate 14 and combination magnetic return and torque and converter mounting plate 16.

Combination magnetic return and torque converter mounting plate 16 is shown in FIGS. 20 and 21. On the periphery of flange portion 83 of torque converter mounting plate 16 is cylindrical rim portion 85 having a plurality of holes 87 therethrough for securing mounting plate 16 to torque converter cover 18.

Figure 22:
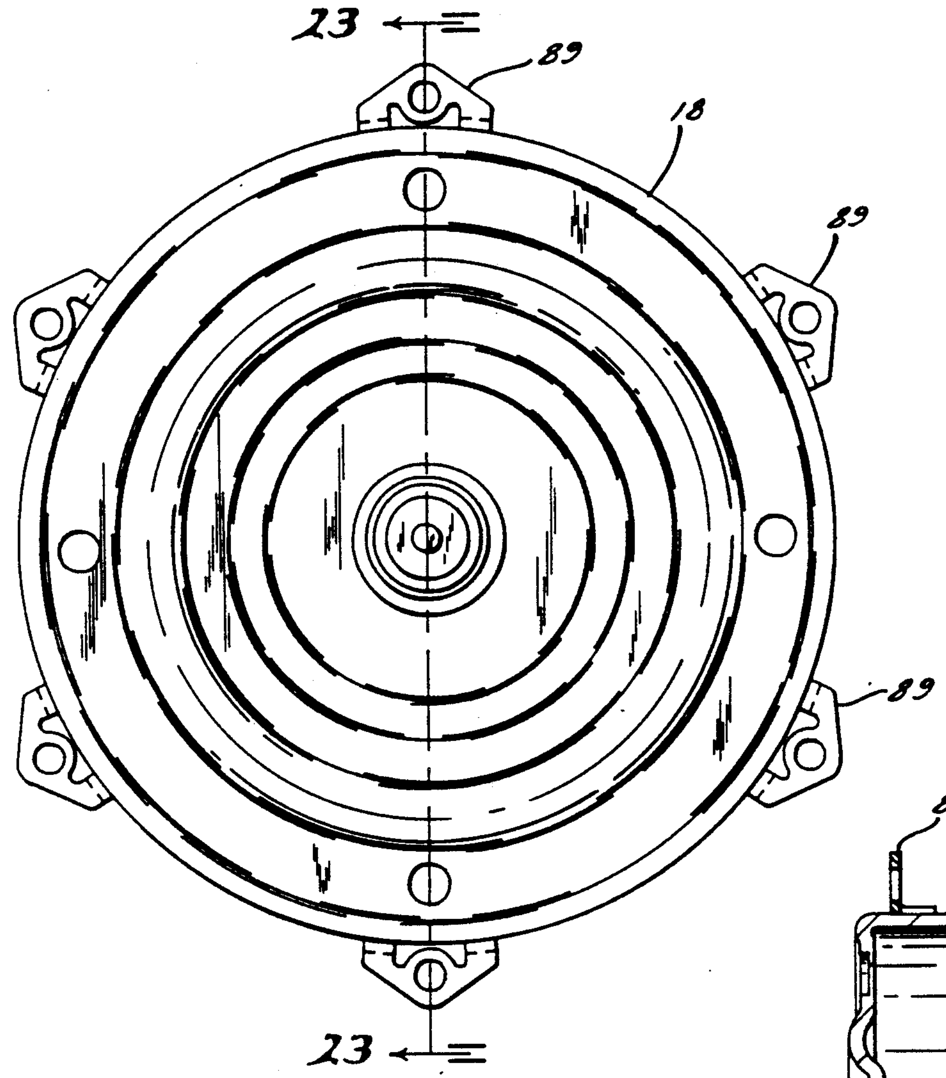
FIG. 22 is an engine end view of a torque converter cover according to the present invention.
Figure 23:
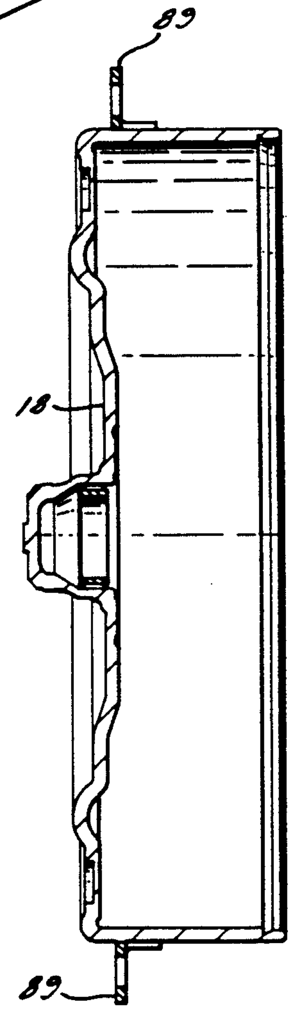
FIG. 23 is a sectional view taken along the line 23—23 in FIG. 22.

Torque converter cover 18 is shown in FIGS. 22 and 23. Cover 18 is a modified conventional torque converter cover having mounting flanges 89 spaced around the perimeter of the cover. Torque converter cover 18 is in turn secured to a shell portion of the impeller assembly of the torque converter, not shown. Combination magnetic return and torque converter mounting plate 16 and torque converter cover 18 are modified conventional parts of a conventional torque converter assembly. Torque converter mounting plate 16 is mounted to torque converter cover 18 by bolts inserted through holes in flanges 89 and into threaded holes 87 on torque converter mounting plate 16 as shown in FIG. 24.

Combination magnetic return and torque converter mounting plate 16 duplicates the traditional coupling function of a flex-plate in a traditional automatic transmission power train. This plate also provides a magnetic return path for the magnetic field generated by the magnets in the assembly. As shown by the arrows in FIG. 26A, magnetic flux, emanating from the face of magnets 76, crosses through the stator winding assembly 22 and into mounting plate 16 where the flux diverts and is directed back across the stator winding assembly 22 to the face of the adjacent magnets 76 having opposite polarity. Plate 16 also directs some of the flux through disc portion 42 and portion 40 of the switch and magnetic mounting plate 14 which completes the magnetic return path to the opposite side of magnets 76.

In a manual transmission power train, combination magnetic return and torque converter mounting plate 16 can be readily adapted to the flywheel-clutch assembly, as practitioners of the art can readily recognize. Thus the alternator starter of the present invention is easily adapted to both automatic and manual transmissions.

Figure 24:
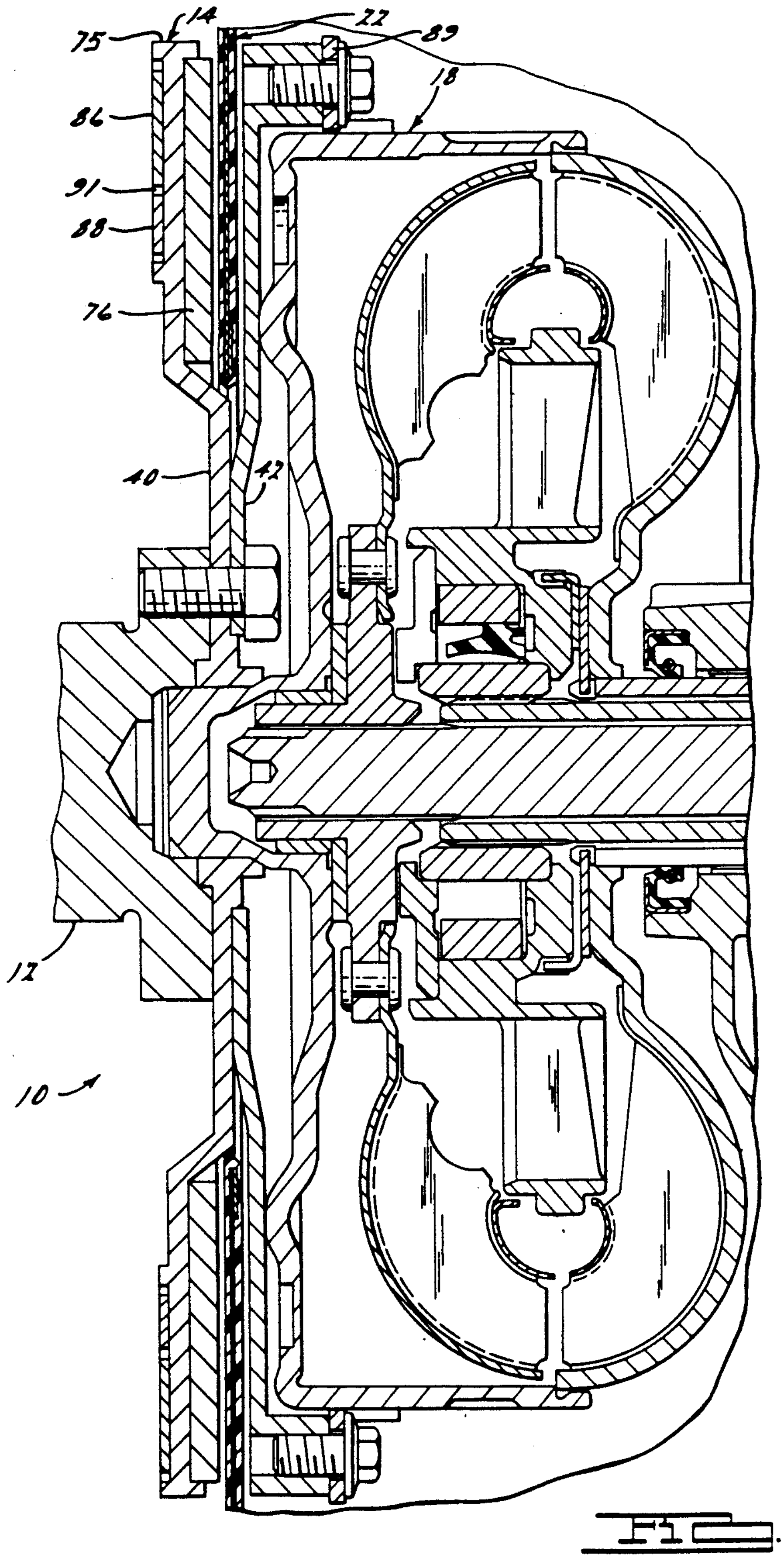
FIG. 24 is a partial sectional view of the assembled alternator starter assembly according to the invention connected to the torque converter.

When assembled, the alternator starter assembly as envisioned in this embodiment of the present invention is a relatively flat disc shaped assembly mounted between the rear end of the engine and the front end of either the torque conveter as shown in FIG. 24 or the flywheel-clutch assembly in a manual transmission (not shown). The engine crankshaft 12 extends to the alternator starter assembly and is coupled to the torque converter via torque converter mounting plate 16. Mounted on the crankshaft 12 is commutator and magnet mounting plate 14 having magnets 76 mounted on one side, and inner and outer switch rings 80 and 82 mounted on the other side and mounting plate 16. Thus plates 14 and 16 rotate within the alternator starter assembly with the crankshaft 12 while the stator winding assembly 22 and the brush and stator mounting plate 24 remain stationary.

When functioning as an alternator, as the engine crankshaft turns, this in turn turns switch and magnet mounting plate 14 and mounting plate 16 which causes permanent magnets 76 to pass by straight portions 45 of winding 44 in stator winding assembly 22. The magnetic flux produced by the magnets which cuts the conductor windings of stator winding assembly 22, as shown by the arrows in FIG. 26A, causes current of alternating plurality to flow through the stator winding assembly 22 producing an AC output in the three phase windings of the preferred embodiment shown. The output from each phase or winding set may be rectified and controlled separately, or one phase may be used to provide DC through rectification while the other two sets or phases may be used to provide AC into loads that do not require DC for their operation. These AC loads do not have to operate at the same voltage as do the DC loads, nor at the same AC voltage as each other.

Brush assembly 20 according to the present invention is shown in FIGS. 1, 11, 11A, 12, and 25. Brush assembly 20 is only utilized during operation of the alternator starter as a starter motor. In this embodiment, brush assembly 20 is physically rotated out of engagement with inner and outer switch rings 80 and 82 prior to the alternator functioning of the alternator starter assembly. This disengagement of the brush assembly disconnects the vehicle battery from the windings directly and separates the phases enabling separate output loading of each phase according to particular design requirements.

Brush assembly 20 is pivotally mounted about pivot pin 92 in brush and stator mounting plate 24. Brush assembly 20 is mounted on pivot arm 94 which is in turn connected pivotally to pin 92. Brush assembly 20 comprises housing 96 which has positioned therein eight brushes 98, 100, 102, 104, 106, 108, 110, and 112. Each of these brushes is biased outward toward inner and outer switch plates 80 and 82 by springs 114.

Figure 11A:
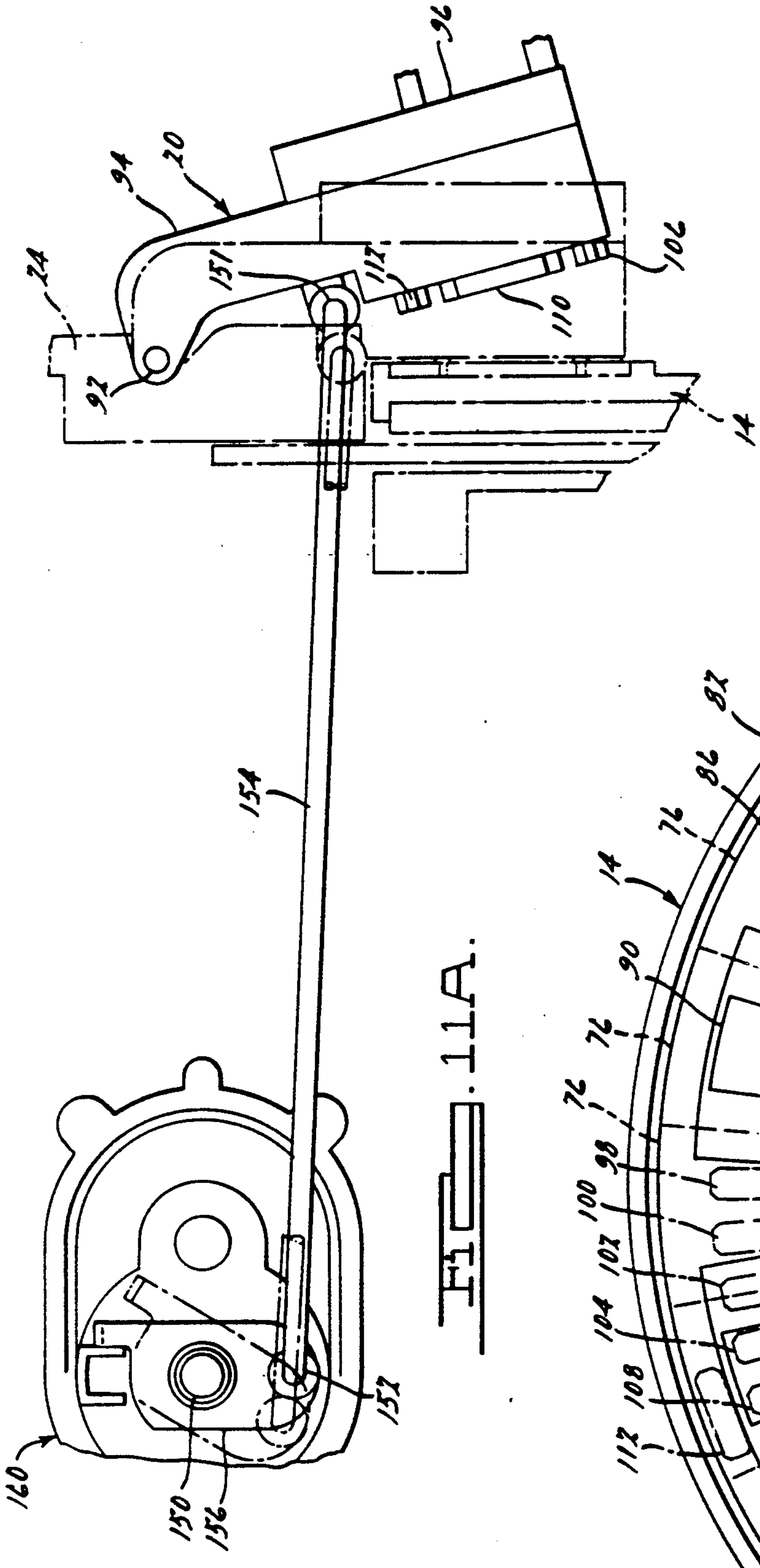
FIG. 11A is a perspective view of the brush assembly showing the prototype pivot linkage.

As shown in FIG. 11A, brush assembly 20 is rotated about pin 92 by pivot arm 94. In the prototype shown, pivot arm 94 is connected via link rod 154 to pivot pin 151 which is in turn rotatably attached to pivot pin 152 on cam 156. Cam 156 is fixed to shaft 150. When the motor 160 is energized, cam 156 rotates counterclockwise pushing via link rod 154 against pivot arm 94 to lift brush assembly 20 out of engagement with switch rings 80 and 82. When the vehicle ignition is turned on and the key switch turned to start, the motor 160 rotates clockwise, lowering the brush assembly into engagement with switch rings 80 and 82 as shown by the dotted lines in FIG. 11A. Once the engine has started, in about one second, the brush assembly is rotated out of engagement. This arrangement is typical of a brush assembly engaging mechanism. Other configurations such as a solenoid actuation system may be utilized to achieve the same results.

The complete brush assembly is shown mounted on the complete alternator starter assembly shown from the engine end view in FIG. 25. The footprint of the brushes in brush assembly 20 shown in FIG. 25 is illustrated in FIG. 26. Brushes 106 and 112 are positioned on the ring portion of inner switch ring 80 and outer switch ring 82 respectively. Brushes 106 and 112 are in turn electrically connected to the positive and negative terminals of the vehicle battery. Brushes 110 and 102 are connected to the phase I winding, tabs 66 and 67 of stator assembly 22. Brushes 108 and 100 are in turn connected to the phase II winding assembly through tabs 68 and 69 in stator assembly 22. Brushes 104 and 98 are connected to the phase III winding assembly in stator assembly 22 via tabs 70 and 71.

As shown in FIG. 26, the phase I winding assembly connected via brushes 110 and 102 is not energized. The other two phase winding assemblies, phase II and III, connected via brushes 108 and 100, and 104 and 98, are shown in conduction. As switch and magnet mounting plate 14 rotates, two or three sets of windings will be energized at any given time.

Figure 26A:
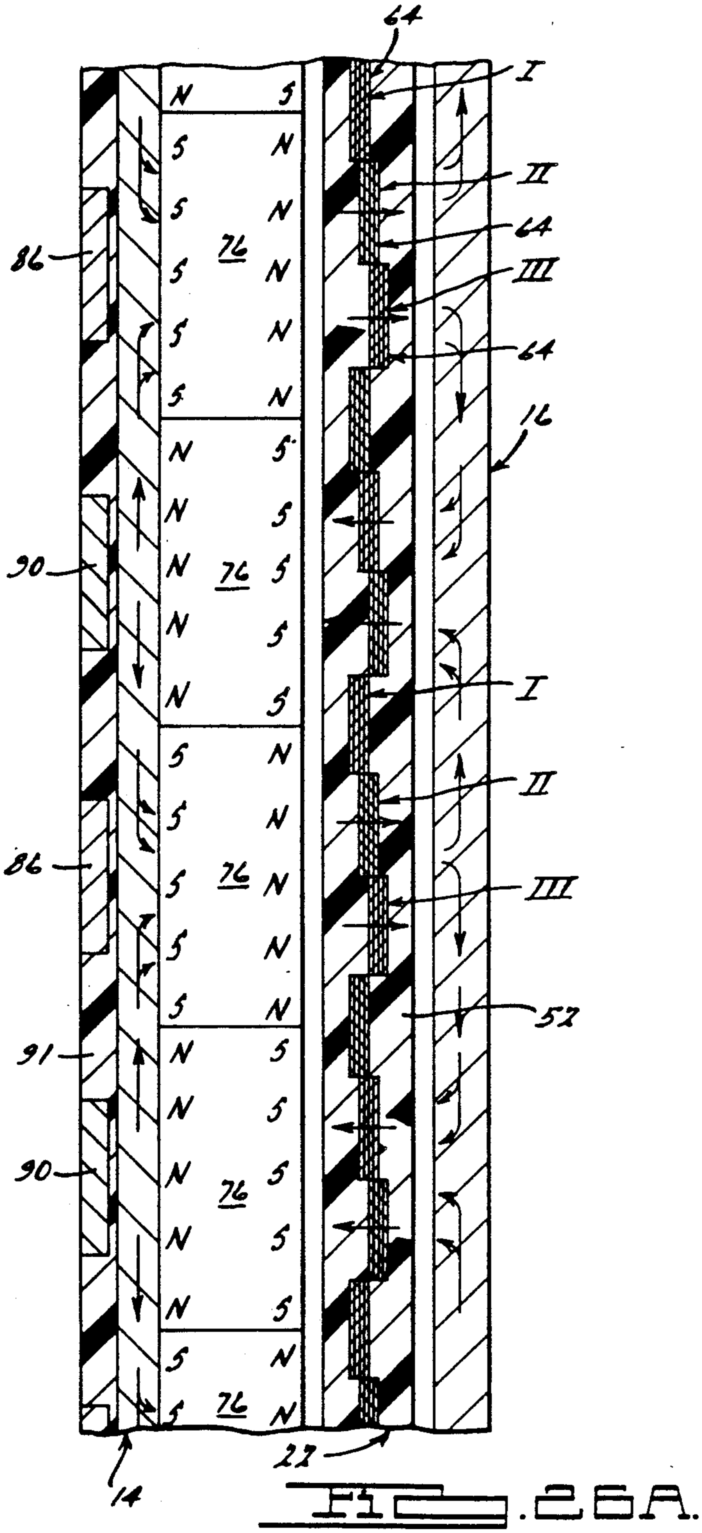
FIG. 26A is a partial sectional view of the assembled alternator starter taken along the line 26A—26A in FIG. 25.
Figure 26:
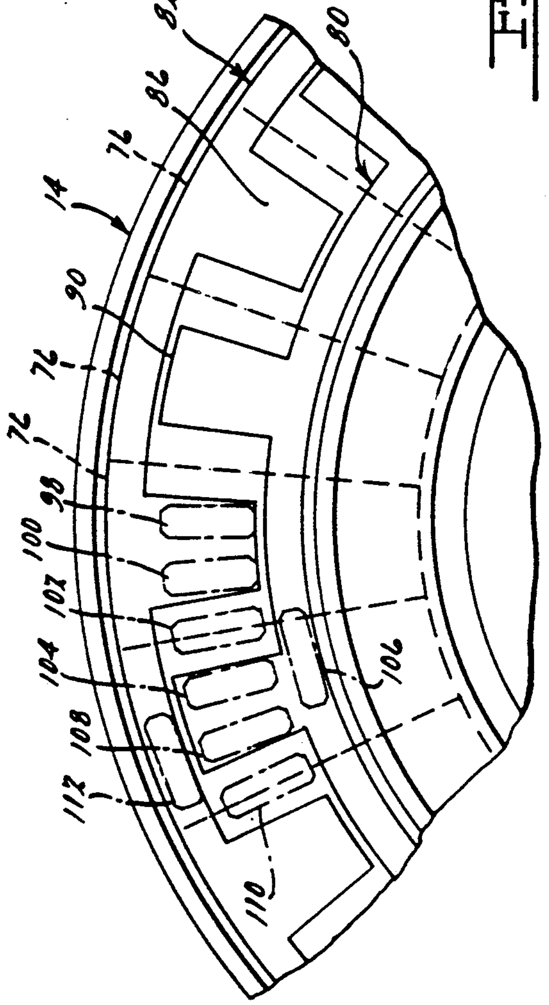
FIG. 26 is a partial engine end view of the assembled alternator starter shown in FIG. 25, with brush assembly removed, illustrating the brush contact special configuration on an area of the switch and magnet plate surface.

As shown in FIG. 26A, phase II and III winding sets are opposite the magnet face of each magnet 76 while the phase I winding set is opposite the transition between magnets. Phases II and III are in conduction with current flow in the same direction. Therefore torque is produced in only one direction. As the crankshaft turns, different phase windings conduct in sequence. The current passing through the alternating magnetic fields produced by permanent magnets 76 is therefore switched to produce a torque in one direction which causes rotation of crankshaft 12 and in turn starts the vehicle engine. The faster that the crankshaft turns, the faster the switching of DC voltage supplied to the stator winding sets. Therefore, the switching is always in synchronization with the speed of rotation.

Because of the flat stator design and the use of rare earth magnets such as neodymium alloy magnets in the alternator starter of the present invention, an extremely strong magnetic field is produced. When current is passed through the stator windings a correspondingly large amount of torque is produced, similar to the characteristics of a shunt or fixed field DC motor. Consequently the engine is started in a short amount of time. The brushes are lifted off of the switch plate automatically. This is performed by an automatic control circuit (not shown) and actuator shown in FIG. 11A which disengages the brush assembly from contact with the inner and outer switch rings.

During alternator operation, when the vehicle engine is running, the brush assembly and switch plates 80 and 82 are not needed and not used. Switch and magnet mounting plate 14 simply acts as a flux return path for magnetic flux produced by magnets 76. During operation as an alternator, the magnetic flux path can be seen clearly in FIG. 26A. The magnetic flux path is from the face of magnet 76, through an air gap and through stator winding assembly 22, another air gap, and into torque converter mounting plate 16. Magnetic flux is then diverted sideways, then back through the air gap, stator winding assembly 22, another air gap to the adjacent magnet face having opposite polarity. Flux is also directed through disc portions 42 and 40 and back to the opposite side of magnet 76. Magnetic flux exiting the face of magnets 76 against magnet race 74 is also directed through plate 14 to the adjacent magnets having opposite polarity.

Figure 27:
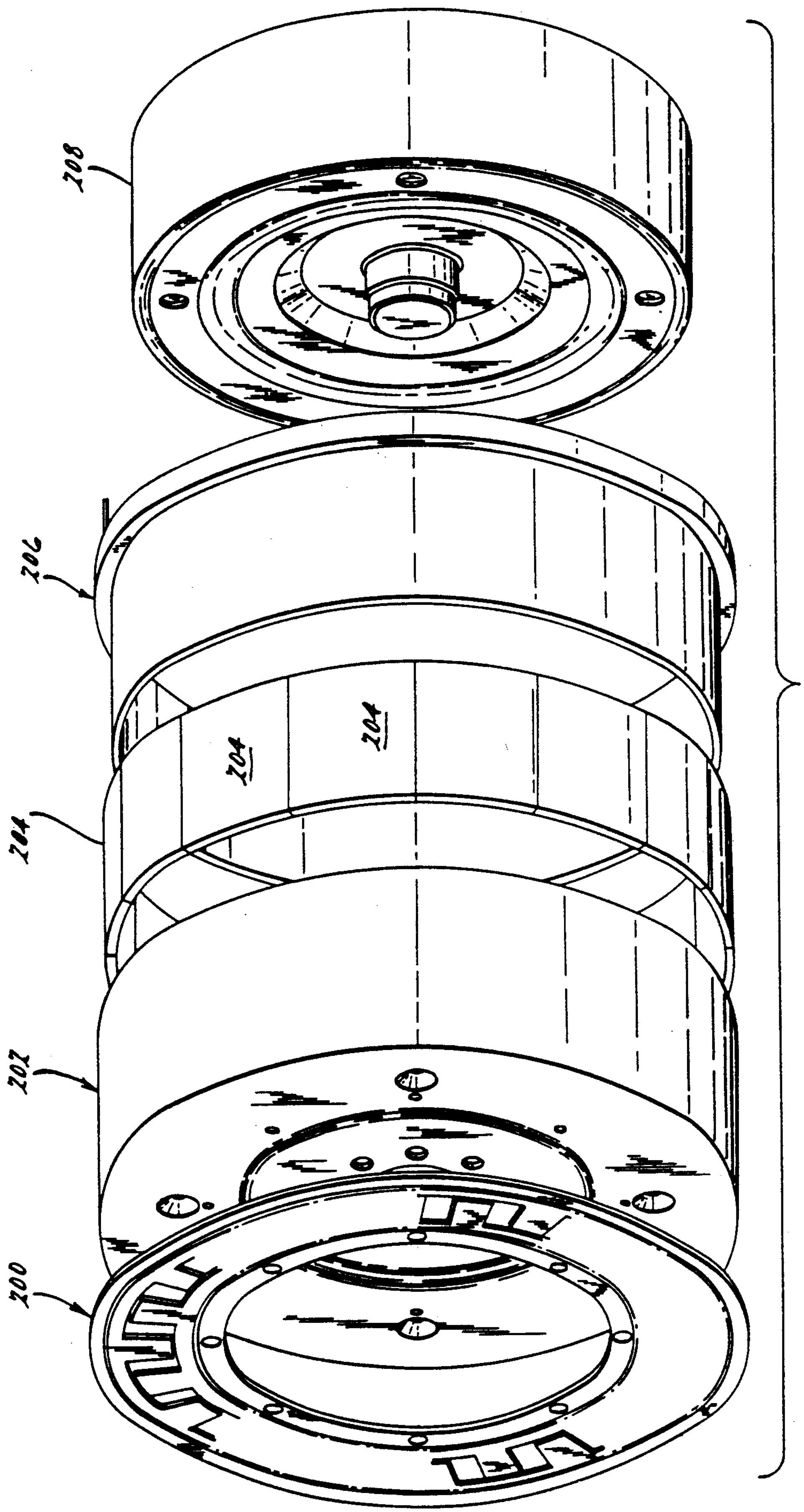
FIG. 27 is an exploded view of an alternative embodiment according to the present invention.
Figure 28:
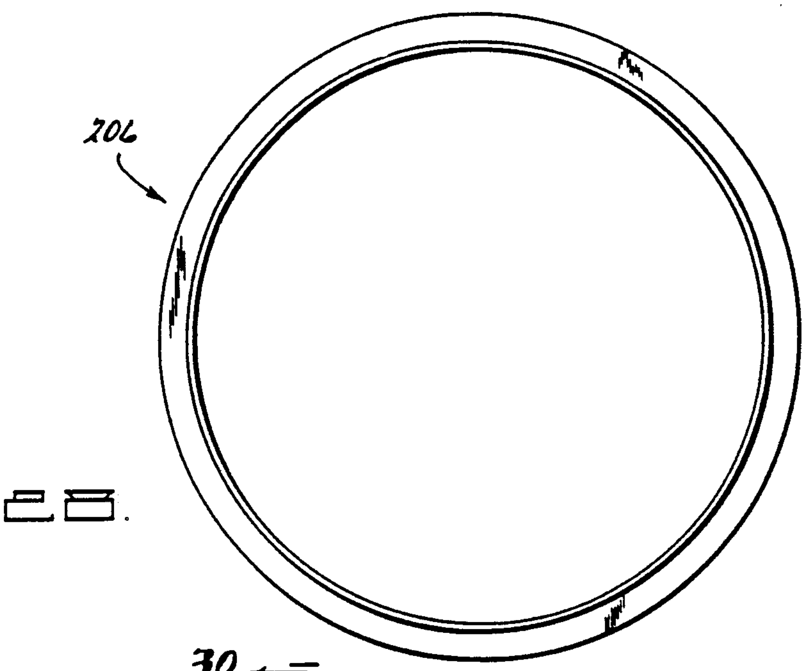
FIG. 28 is an end view of the stator assembly in the alternative embodiment of the invention shown in FIG. 27.
Figure 29:
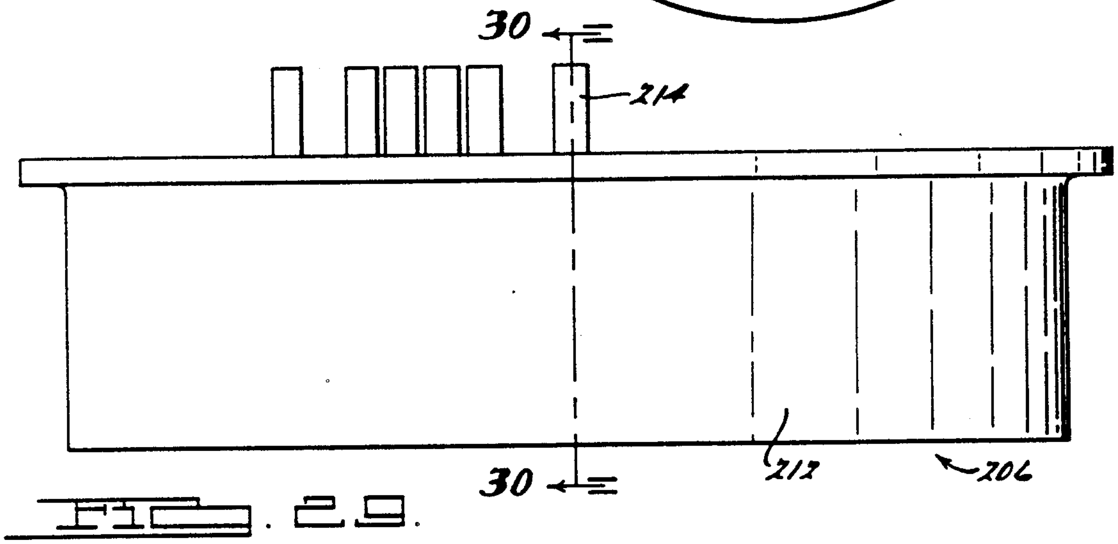
FIG. 29 is a side view of the stator assembly of the alternative embodiment of the present invention shown in FIG. 27.

An alternative embodiment of the present invention is shown in the exploded view in FIG. 27. In this embodiment permanent magnets 204 are positioned within magnet mounting drum 202 which is in turn bolted to power or crank shaft 12 as in the previous embodiment. Switch plate 200 is bolted to the disc portion of magnet mounting drum 202.

Figure 31:
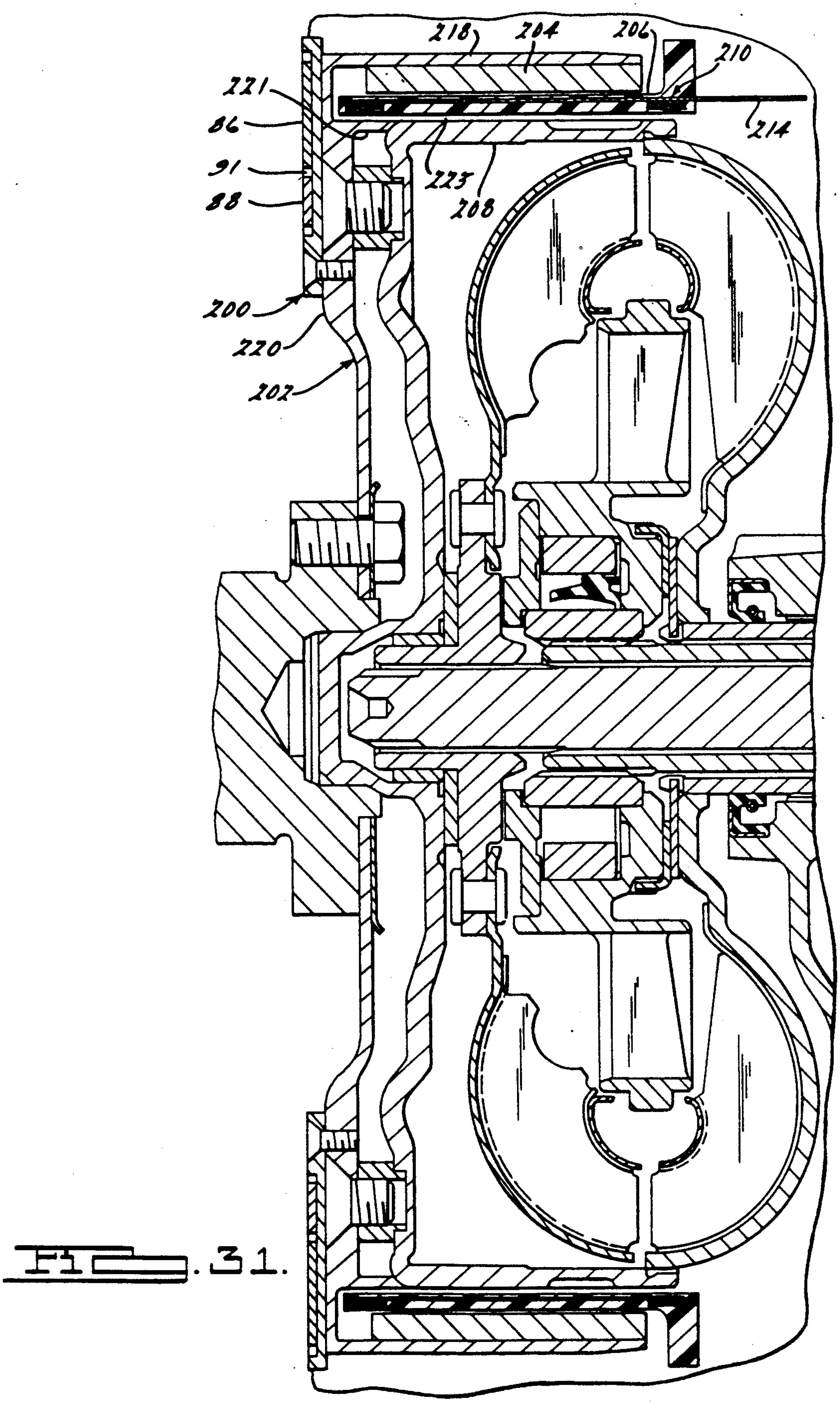
FIG. 31 is a partial sectional view of the assembled alternator starter according to the alternative embodiment of the present invention.

Stator assembly 206 is again stationary but is constructed in cylindrical form. Stator assembly 206 is mounted directly on the engine frame or can be mounted on the transmission housing as shown in FIG. 31, which is in turn bolted to the engine frame.

Figure 30:
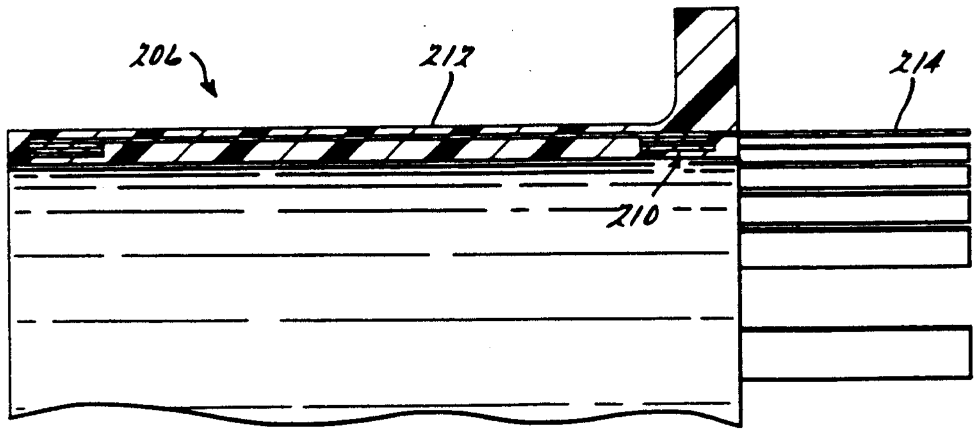
FIG. 30 is a sectional view of the stator assembly shown in FIG. 29 taken along 30—30.

With reference to FIG. 30, stator assembly 206 comprises winding sets 210 within cylindrical stator body 212 made of an insulative resin encapsulating windings 210. Each winding set 210 within stator assembly 206 terminates in tabs 214 which extend axially from stator assembly 206. Tabs 214 are connected via a brush assembly 20 as in the previous embodiment or, in an alternative switching arrangement, to a vehicle battery during the starting operation. Prior to alternator operation, once again, the brushes are disengaged from switch plate 200.

Although not shown in FIG. 27, the brush assembly 20 is pivotally mounted to the engine frame so as to be engagable with the switch plate 200 during starter motor operation and disengaged prior to the alternator mode of operation.

Switch plate 200 is a generally flat ring shaped disc which is bolted to the disc portion of magnet mounting drum 202. Alternatively, switch plate 200 may be integral to the disc portion of drum 202. One side of plate 200 has switch rings 80 and 82 as in the previous embodiment mounted similarly in an insulative resin matrix on the surface of plate 200.

Operation of the alternative embodiment can readily be seen in FIG. 31. Switch plate 200 is positioned similarly to that in the previous embodiment. Magnets 204, magnet mounting drum 202, switch plate 200, and torque converter cover 208 all rotate together about the axis of rotation of crank shaft 12. Stator assembly 206 remains stationary. The flux path begins at the face of the magnets 204, crosses an air gap, through the windings in stator assembly 206, crosses another air gap, into torque converter cover 208. The flux then diverts sideways, then back across the air gap, through stator assembly 206, and another air gap to the face of the adjacent magnet. Some of the flux also is directed axially along cover 208 to the magnet mounting drum 202 and then to the opposite face of the magnet. Operation of this alternative embodiment of the present invention is identical to the operation of the embodiment previously described. However, this embodiment is not as readily adaptable to existing transmission designs as is the previously described embodiment. On the other hand, this embodiment is lighter and requires less axial space than in the embodiment previously described.

Figure 32:
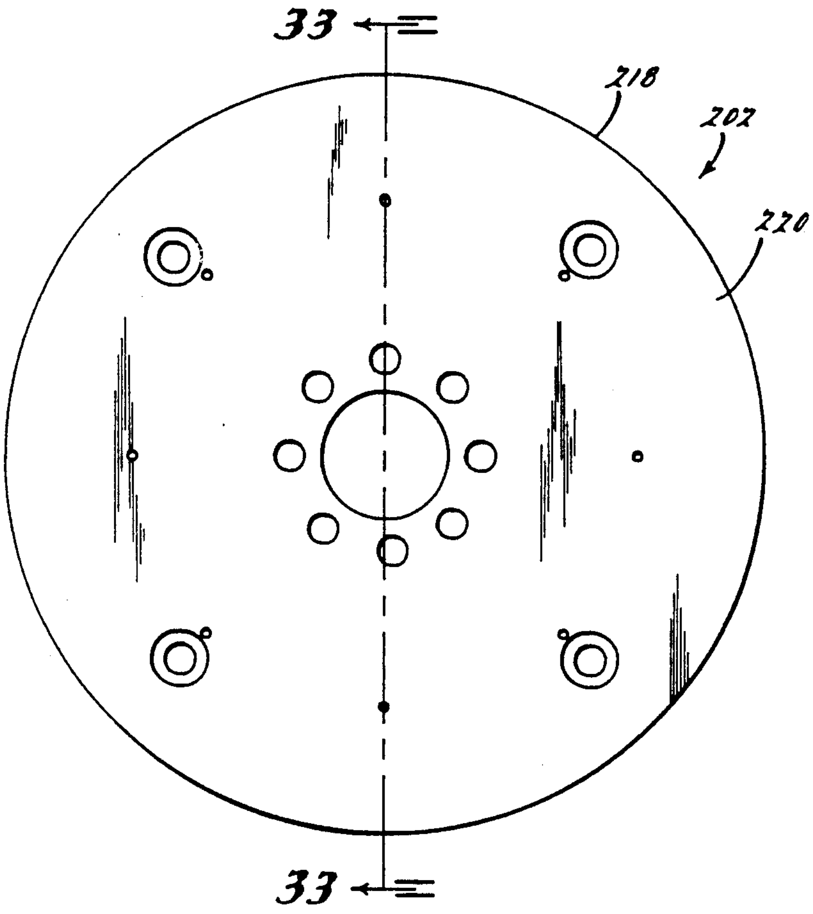
FIG. 32 is an engine end view of the magnet plate in the alternative embodiment of the present invention shown in FIG. 27.
Figure 33:
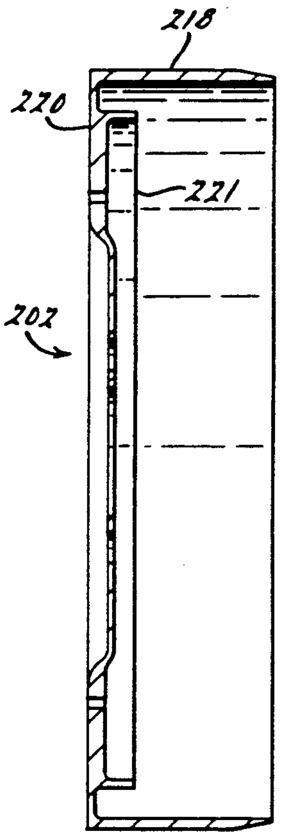
FIG. 33 is a sectional view of the magnet plate taken along the lines 33—33 in FIG. 32.

The magnet mounting drum 202 is shown in an end view in FIG. 32 and in sectional view in FIG. 33. The magnet mounting drum comprises tubular portion 218 and radial disc portion 220. Permanent magnets 204 have rectangular faces and are curved to fit the inside of tubular portion 218. They are mounted to the inside surface of portion 218 and positioned so that alternating polarity faces are against the inside surface of portion 218. A cylindrical rim portion 221 is centered on the disc portion 220 and is concentric to and within tubular portion 218. Rim portion 221 abuts the outer perimeter of torque converter cover 208. Rim portion 221 provides a magnetic return path coupling from the torque converter cover 208 to radial portion 218 of magnet mounting drum 202. This return path is important to minimize flux losses.

Thus the combination of the drum 202 and torque converter cover 208 attached thereto creates a tubular channel 223 between them. The stationary stator assembly 206 fits within channel 223 so as to position windings 210 adjacent magnets 204.

Figure 34:
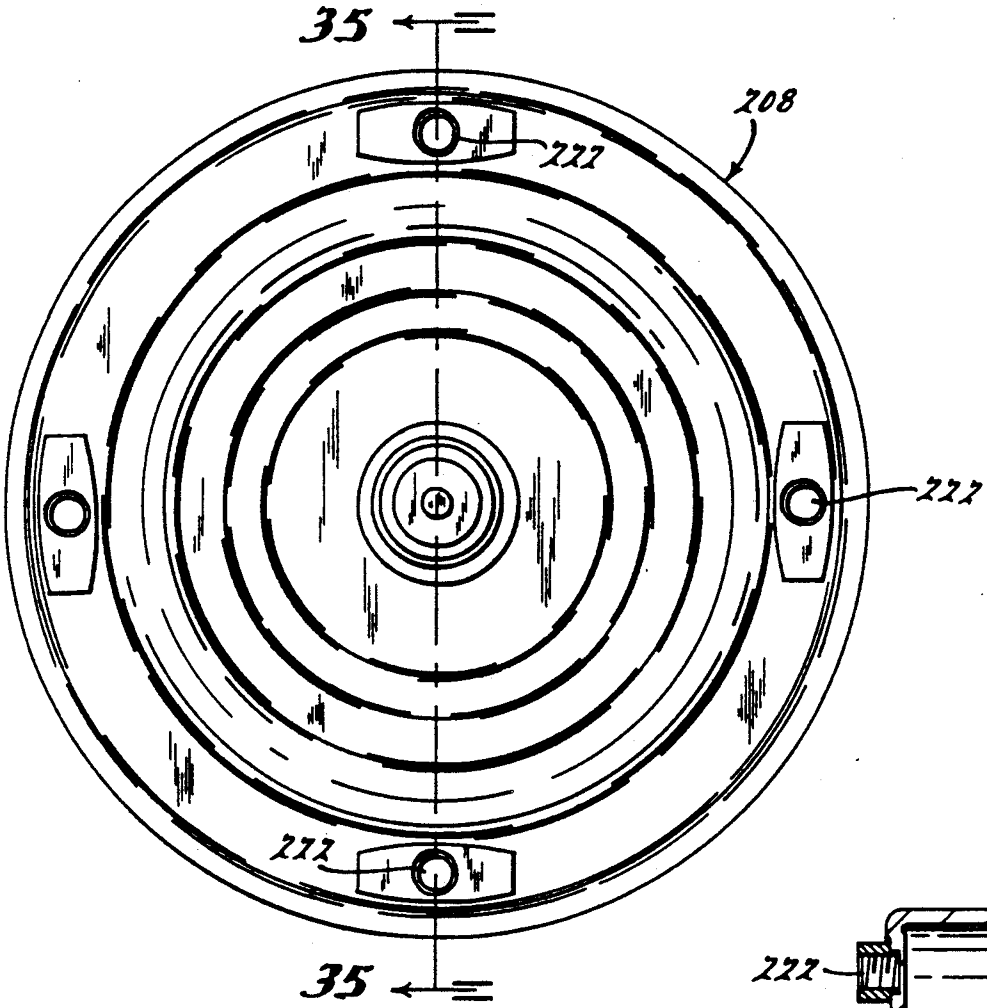
FIG. 34 is an engine end view of the torque converter cover for the alternative embodiment of the invention shown in FIG. 27.
Figure 35:
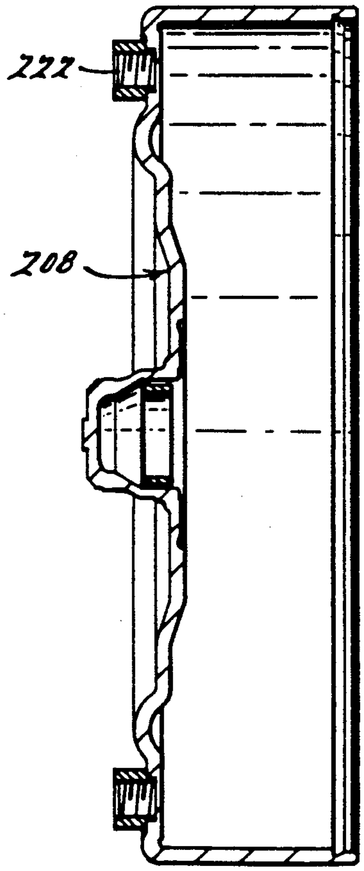
FIG. 35 is a sectional view of the torque converter shown in FIG. 34 taken along line 35—35.

The front of the torque converter cover 208 is shown in FIGS. 34 and 35. In the embodiment shown, torque converter cover 208 is virtually identical to the conventional torque converter covers in use today except for having mounting holes 222. Mounting holes 222 receive conventional bolts which secure magnet mounting drum 202 to cover 208.

Figure 36:
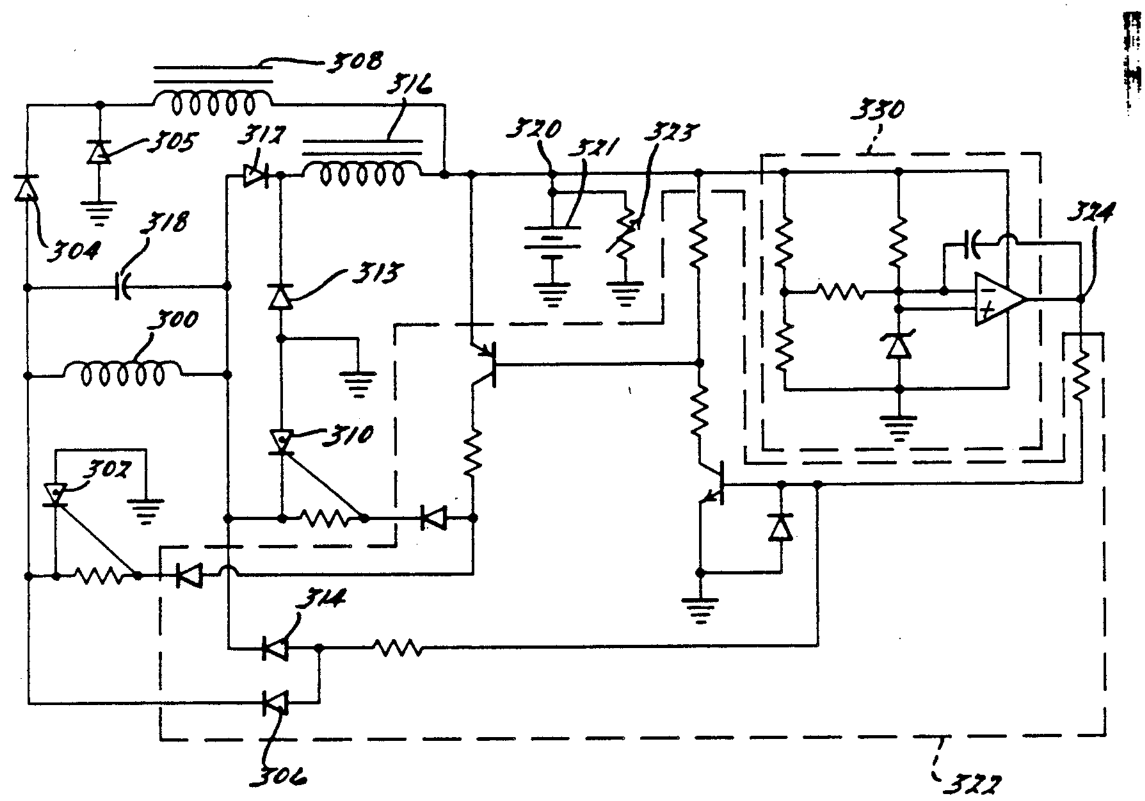
FIG. 36 is a schematic diagram of a voltage control circuit used with the alternator starter of the present invention.
Figure 37:
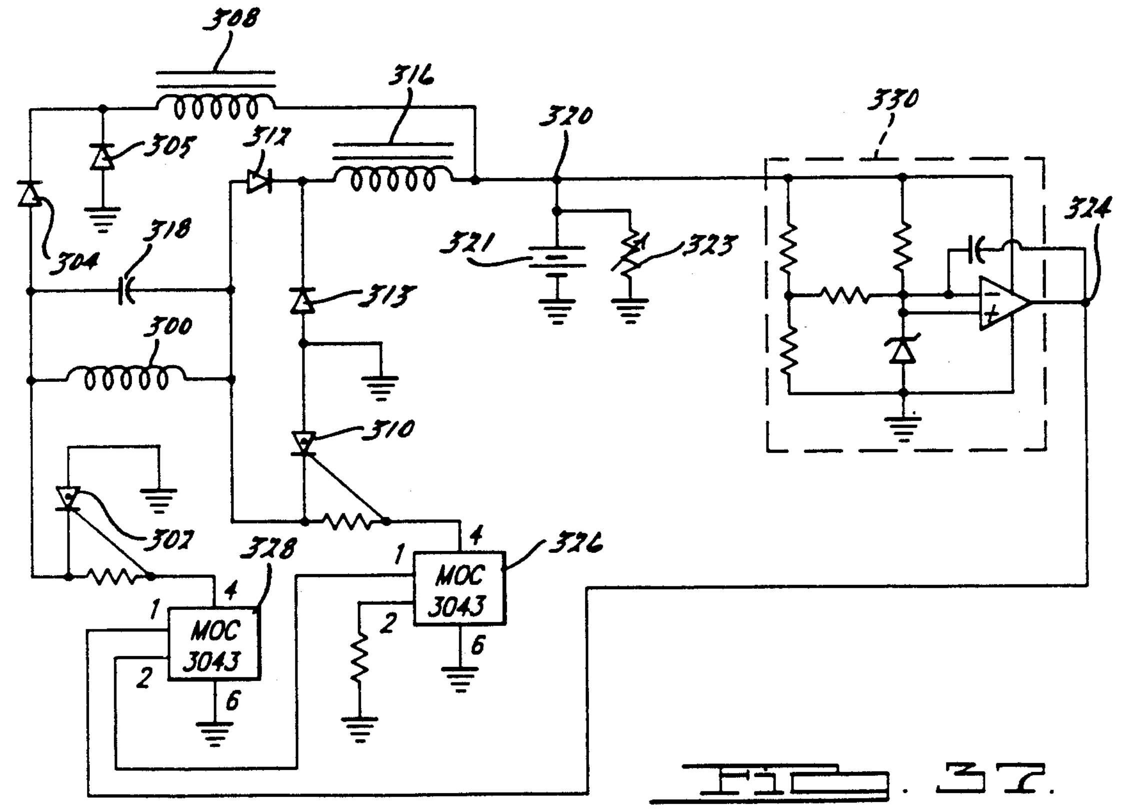
FIG. 37 is schematic diagram of an alternative embodiment of a voltage control circuit used with the alternator starter of the present invention.

FIG. 36 and FIG. 37 show basic schematics of prototype voltage control circuits used to regulate the output of the alternator starter of the present invention. Other comparable control schemes may also be utilized and do not limit the scope of the present invention. These circuits use only one phase winding set to supply electrical power to the external vehicle circuits. Another similar circuit could be connected to another phase to provide power to additional circuits. Alternatively, the other phases could be used to supply AC power to appropriate external circuits.

Referring to FIGS. 36 or 37, tied to one end of stator winding set 300 is one end of silicon controlled rectifier (SCR) 302 and diodes 304 and 306. Tied to the other end of diode 304 is diode 305 and choke 308. Tied to the other end of stator winding set 300 are one end of SCR 310 and diodes 312 and 314. Tied to the other end of diode 312 are diode 313 and choke 316. These components function in conjunction with each other forming a filter circuit to provide a constant voltage to the battery and external circuits connected between the positive and negative terminals of the battery, point 320 and ground. Capacitor 318 placed across stator winding 300 prevents brush arcing during operation of the alternator starter as a starter motor.

In FIG. 36 the components inside the closed dotted line 322 form a zero crossover circuit to allow the SCRs to turn on only when the stator voltage is near zero and the voltage at point 324 is high.

In FIG. 37 the zero crossover function is provided by two Opto-isolator Triac Driver With Internal Zero Crossing Circuits (Motorola MDC 3043 or equivalent) 326 and 328. The opto-isolators 326 and 328 also guarantee high voltage isolation from the control circuit.

The portion of the circuit inside the closed dotted line 330 in FIG. 36 is an operational amplifier integrator circuit that provides a high voltage at point 324 whenever the voltage at point 320 is below a desired level. An identical circuit also provides a high voltage at point 324 an conjuction with a below desired level at point 320 in the similar circuit shown in FIG. 37.

The chokes 308 and 316 are used as a filter to provide a relatively constant current available into the external circuits and battery. The time constant of the chokes is chosen to equal several cycles of the AC voltage generated by stator 300. If the voltage at point 320 is low the voltage at point 324 increases trying to turn on the within the limits set by the zero crossing circuits. When the stator voltage is within the limits, the SCR which has a negative voltage applied to its cathode will remain on for the entire half cycle. If this voltage is still low at point 320 at the end of the first half cycle, the other SCR will turn on. This procedure will alternate and repeat until the voltage requirements at point 320 are satisfied.

During the half cycle when SCR 302 is conducting the circuit is completed through the stator 300, diode 312, choke 316, the battery 321 and external circuit load 323 back to ground. When the SCR 302 turns off current will continue to flow in the part of the circuit composed of choke 316, diode 313, and back to diode 313 through the battery 321 and load 323. SCR 310, Diode 304, Diode 305 and choke 308 will operate in the same manner on the opposite half cycles. Since the chokes have current flowing during both charge and discharge cycles, it can be seen that the load current is made of simultaneous currents, flowing through chokes 308 and 316, and load current may be flowing with neither SCR conducting.

From the above description it is seen that this invention provides a unique alternator starter for an internal combustion engine having an ironless stator and requiring minimal axial space within the engine drive train. The present invention has been described in an illustrative manner and it is to be understood that the terminology which has been used is intended to be in the nature of words of description rather than of limitation.

Obviously many modifications and variations of the present invention are possible in light of the above teachings. It is therefore to be understood that within the scope of the amended claims, the invention may be practiced otherwise than specifically described.

What is claimed is:

1. An electrical machine adapted for use as an integral dual purpose motor and generator having a rotatable power shaft, said machine comprising:
- a nonmagnetic stator winding means for conducting electrical current therethrough;
- a plurality of high flux permanent magnets creating a plurality of magnetic fields of flux having alternating polarity passing through said stator winding means, said winding means and said magnets being movable relative to each other about said shaft;
- a flux return path of magnetically permeable material for said fields passing through said stator winding means, said path being fixed relative to said magnets; and
- a means for directing electrical current in said winding means producing mechanical torque in one direction on said shaft when said machine is operated as a motor, whereby mechanical torque is applied to said shaft by the relative motion of the current passing through the magnetic fields of the permanent magnets, and electrical current is produced in said stator means when said magnetic field from said permanent magnets passes through said winding means as said shaft is rotated.

2. An electrical machine adapted for use as an integral alternator starter motor positioned on an engine having a rotatable power shaft, said machine comprising:
- a stationary nonmagnetic stator winding means for conducting electrical current therethrough;
- a plurality of high flux permanent magnets creating a plurality of magnetic fields of flux of alternating polarity passing through said stator winding means;
- means for supporting said magnets from said shaft adjacent said stator winding means said supporting means being fixed relative to said magnets;

flux return path means spaced from and fixed relative to said means for supporting said magnets, the stator winding means positioned between the means for supporting and the flux return path means;

means for directing electrical current in said winding means so as to produce mechanical torque in one direction on said shaft when said machine is operated as a starter motor; and control means for regulating the electrical current generated in said stator winding means when said machine is operated as an alternator so as to supply electrical current to external circuits, whereby when electrical current is fed through said stationary stator means by said means for directing current, mechanical torque is applied to said shaft by the relative motion of the current passing through the magnetic field of the permanent magnets, and electrical current is produced in said stator means when said magnetic field from said permanent magnets passes through said winding means as said shaft is rotated by said engine.

3. The machine according to claim 1 or 2 wherein said stator winding means comprises a generally flat ring shaped stator body lying about said shaft in a plane perpendicular to said shaft, said ring shaped body having an inner perimeter and an outer perimeter encircling said shaft and at least one generally flat conductive metal winding within said stator body having a beginning end and a terminal end, said winding undulating radially between said outer perimeter and said inner perimeter as said winding encircles said shaft in said plane making a single pass around said ring shaped body.

4. The electrical machine according to claim 3 wherein said stator winding means further comprises a set of windings within said stator body each having a beginning end and a terminal end, each of said flat windings undulating radially between said outer perimeter and said inner perimeter as each of said windings encircles said shaft.

5. The electrical machine according to claim 4 wherein said set further comprises:

a first winding having a beginning end and a terminal end, its beginning end terminated on a first radially extending tab pad;

a second winding having a beginning end and a terminal end, its beginning end attached to the terminal end of said first winding;

a third winding having a beginning end and a terminal end, its beginning end attached to the terminal end of said second winding; and a fourth winding having a beginning end and a terminal end, its beginning end attached to the terminal end of said third winding, said terminal end of said fourth winding terminated on a second radially extending tab pad, whereby said windings are connected in series to form a single winding set.

6. The electrical machine according to claim 5 wherein each of said windings further comprises:

a plurality of radial straight portions, each having inner and outer ends;

a plurality of inner arcuate portions connected between adjacent radial straight portions at said inner ends; and a plurality of outer arcuate portions connected between said radial straight portions so as to connect the outer end of a straight portion to an outer end of an adjacent straight portion whereby said straight portions are connected to each other in series and positioned in stacked axial alignment within said body forming an axially stacked coil.

7. The electrical machine according to claim 6 wherein said straight and arcuate portions are equal in number in each winding.

8. The electrical machine according to claim 7 wherein said radial portions are equiangularly spaced and equal in number to the number of permanent magnets.

9. The electrical machine according to claim 8 wherein there are twenty four radial straight portions, each having a width of less than five degrees.

10. The electrical machine according to claim 9 wherein each winding is coated with an insulative resin so as to insulate adjacent windings from each other.

11. The electrical machine according to claim 8 wherein said stator body further comprises:

a first winding set;

a second winding set stacked on and angularly displaced from said first winding set by about twenty degrees; and a third winding set stacked on and angularly displaced from said second winding set by about twenty degrees whereby said straight portions of said windings do not overlap a straight portion of another set.

12. The electrical machine according to claim 11 wherein the arcuate portions of said second set are bent in an S shape and positioned between said first and third winding sets so that no more than two sets are stacked one on another at any location in said stator body.

13. The electrical machine according to claim 2 wherein said means for supporting comprises:

a first disc member of magnetically permeable metal having an outer ring portion and a central disc portion, said outer ring portion of said first disc member having an outer face and an inner face;

and wherein said flux return path means comprises:

a second disc member of magnetically permeable material having an outer ring portion and a central disc portion;

said first and second members having said central disc portions fastened together and to said shaft, said outer ring portions being axially offset so as to form an annular channel having parallel sides therebetween in which said stator means resides; and said permanent magnets being mounted on the inner face of said ring portion of said first disc member and adjacent said stator means in said channel, said magnets being positioned with adjacent magnet faces having alternating polarity facing said stator means.

14. An electrical machine adapted for use as an integral alternator starter motor positioned on an engine having a rotatable power shaft, said machine comprising:

a stationary nonmagnetic stator winding means for conducting electrical current therethrough;

a plurality of high flux permanent magnets creating a plurality of magnetic fields of flux of alternating polarity passing through said stator winding means;

means for supporting said magnets from said shaft adjacent said stator winding, said supporting means providing a flux return path of magnetically permeable material for said fields passing through said winding means, said supporting means being fixed relative to said magnets and comprising a first disc member of magnetically permeable metal having an outer ring portion and a central disc portion, said outer ring portion of said first disc member having an outer face and an inner face, a second disc member of magnetically permeable material having an outer ring portion and a central disc portion, said first and second members having said central disc portions fastened together and to said shaft, said outer ring portions being axially offset so as to form an annular channel having parallel sides therebetween in which said stator means resides, and said permanent magnets being mounted on the inner face of said ring portion of said first disc member and adjacent said stator means in said channel, said magnets being positioned with adjacent magnet faces having alternating polarity facing said stator means;

means for directing electrical current in said winding means so as to produce mechanical torque in one direction on said shaft when said machine is operated as a starter motor wherein said means for directing current comprises:

a stationary brush assembly pivotally mounted adjacent said first disc member;

an insulative substrate on said outer face of said first disc member;

a flat inner conductive metal switch ring having a plurality of equally spaced radially outwardly projecting contact tabs embedded in said insulative substrate; and a flat outer conductive metal switch ring having a plurality of equally spaced radially inward projecting contact tabs embedded in said insulative substrate, said tabs being nested between said rings; and control means for regulating the electrical current generated in said stator winding means when said machine is operated as an alternator so as to supply electrical current to external circuits, whereby when electrical current is fed through said stationary stator means by said means for directing current, mechanical torque is applied to said shaft by the relative motion of the current passing through the magnetic field of the permanent magnets, and electrical current is produced in said stator means when said magnetic field from said permanent magnet passes through said winding means as said shaft is rotated by said engine.

15. The electrical machine according to claim 14 wherein said first disc member further comprises a raised rim around said outer portion, said rim providing a retaining ledge against which said magnets rest when said disc is rotated by said shaft.

16. The electrical machine according to claim 15 wherein said first disc member further includes a raised ridge around the inner margin of said inner face to provide a guide for positioning said magnets between said ridge and said rim on said inner face.

17. The electrical machine according to claim 13 wherein the electrical machine is positioned between said engine and a transmission associated therewith, and said second disc member has a raised rim portion around the periphery of said outer portion, said rim having a plurality of holes therethrough for fixing said second disc member to said transmission whereby said shaft is mechanically connected to said transmission.

18. An electrical machine adapted for use as an alternator starter positioned on an engine having a power shaft therein comprising:

a stationary nonmagnetic stator having a flat ring shaped stator body lying about said shaft in a plane perpendicular to said shaft, said ring shaped body having a tab pad mounted thereon, said body having an inside diameter and an outside diameter;

a set of flat conductive metal windings within said stator body, said winding set having a beginning end and a terminal end, said ends terminated on said tab pad;

each of said flat windings undulating radially between said outer diameter and said inner diameter as said winding encircles said shaft in said plane, each winding making a single pass around said ring, each of said windings being connected in series;

a plurality of permanent magnets axially spaced to one side of said set of windings and creating a plurality of magnetic fields of alternating polarity passing through said stator body;

means for supporting said magnets from said shaft adjacent said stator winding, said supporting means being fixed relative to said magnets;

flux return path means spaced from and fixed relative to said means for supporting said magnets, the set of flat windings positioned between the means for supporting and the flux return path means;

means for directing electrical current in said windings so as to produce mechanical torque in one direction on said shaft when said machine is operated as a starter motor; and control means for regulating the electrical current generated in said stator windings when said machine is operated as an alternator so as to supply electrical current to external electrical circuits, whereby when electrical current is fed through said stationary stator by said means for directing current, mechanical torque is applied to said shaft by the relative motion of the current passing through the magnetic field of the permanent magnets, and electrical current is produced in said stator when said magnetic field from said permanent magnets passes through said windings as said shaft is rotated by said engine.

19. The electrical machine according to claim 18 wherein said means for supporting comprises:

a first disc member of magnetically permeable metal having an outer ring portion and a central disc portion, said outer ring portion of said first disc member having an outer face and an inner face;

and wherein said flux return path means comprises:

a second disc member of magnetically permeable material having an outer ring portion and a central disc portion;

said first and second members having said central disc portions fastened together and to said shaft, said outer ring portions being axially offset so as to form an annular channel having parallel sides therebetween in which said stator means resides; and said permanent magnets being mounted on the inner face of said ring portion of said first disc member and adjacent said stator means in said channel, said magnets being positioned with adjacent magnet faces having alternating polarity facing said stator means.

20. The electrical machine according to claim 2 adapted for placement between the engine and an automatic transmission having a torque converter, and a torque converter cover, and wherein said stationary winding means comprises:

a stationary stator body having a hollow tubular shape centered axially in line with said shaft and fixed to said transmission, said body having a first circular end and a second circular end;

a set of flat conductive metal windings within said stator body, each winding having a beginning end and a terminal end; and each of said flat windings undulating axially between said first end and said second end as said winding encircles said shaft in said body, each winding making a single pass around the circumference of said body.

21. The electrical machine according to claim 20 wherein said set further comprises:

a first winding having a beginning end and a terminal end, its beginning end terminated on a tab pad, said tab pad being integral to said stator body at said second end;

a second winding having a beginning end and a terminal end, its beginning end attached to the terminal end of said first winding;

a third winding having a beginning end and a terminal end, its beginning end attached to the terminal end of said second winding; and a fourth winding having a beginning end and a terminal end, its beginning end attached to the terminal end of said third winding, said terminal end of said fourth winding terminated on said tab pad whereby said windings are connected in series to form a single winding set.

22. The electrical machine according to claim 21 wherein said stator means further comprises a first, a second and a third set of windings, each of said windings makes twenty four equally spaced apart axial passes between said first and second ends, each winding having a width corresponding to an arc of rotation of less than five degrees about said axis projected onto said tubular body, said second set being rotated about said axis from said first set by twenty degrees, and said third set being rotated about said axis from said second set by another twenty degrees.

23. The electrical machine according to claim 22 wherein said windings comprise straight portions oriented parallel to said axis and arcuate portions, said arcuate portions of said second set being bent in an S shape and positioned between said first and third winding sets so that no more than two sets are stacked one on another at any location in said stator body.

24. The electrical machine according to claim 20 wherein each winding is coated with an insulative resin so as to insulate adjacent windings from each other.

25. The electrical machine according to claim 20 wherein said means for supporting comprises:

a drum shaped member of magnetically permeable metal having an outer cylindrical portion and a central disc portion, said outer cylindrical portion of said drum member having an outer side and an inner side, said central disc portion being bolted to said shaft, said stationary stator body being positioned within said cylindrical portion;

said permanent magnets being mounted on the inner side of said cylindrical portion of said drum member and adjacent said stator body, said magnets being positioned with adjacent magnet faces having alternating polarity facing said stator body.

26. An electrical machine adapted for use as an integral alternator starter motor positioned on an engine having a rotatable power shaft, said machine positioned between the engine and an associated automatic transmission having a torque converter and a torque converter cover, said machine comprising:

a stationary non-magnetic stator winding means for conducting electrical current therethrough and comprising:

a stationary stator body having a hollow tubular shape centered axially in line with said shaft and fixed to said transmission, said body having a first circular end and a second circular end, a set of flat conductive metal windings within said stator body, each winding having a beginning end and a terminal end, and each of said flat windings undulating axially between said first end and said second end as said winding encircles said shaft in said body, each winding making a single pass around the circumference of said body;

a plurality of high flux permanent magnets creating a plurality of magnetic fields of flux of alternating polarity passing through said stator winding means;

means for supporting said magnets from said shaft adjacent said stator winding, said supporting means providing a flux return path of magnetically permeable material for said fields passing through said winding means, said supporting means being fixed relative to said magnets and comprising:

a drum shaped member of magnetically permeable metal having an outer cylindrical portion and a central disc portion, said outer cylindrical portion of said drum member having an outer side and an inner side, said central disc portion being bolted to said shaft, said stationary stator body being positioned within said cylindrical portion, said permanent magnets being mounted on the inner side of said cylindrical portion of said drum member and adjacent said stator body, said magnets being positioned with adjacent magnet faces having alternating polarity facing said stator body;

wherein said drum shaped member further includes an inner cylindrical rim member projecting axially from said disc portion connected to said torque converter cover thereby forming a magnetic flux return path from said cover to said magnets;

means for directing electrical current in said winding means so as to produce mechanical torque in one direction on said shaft when said machine is operated as a starter motor; and control means for regulating the electrical current generated in said stator winding means when said machine is operated as an alternator so as to supply electrical current to external circuits, whereby when electrical current is fed through said stationary stator means by said means for directing current, mechanical torque is applied to said shaft by the relative motion of the current passing through the magnetic field of the permanent magnets, and electrical current is produced in said stator means when said magnetic field from said permanent magnets passes through said winding means as said shaft is rotated by said engine.

27. The electrical machine according to claim 12 wherein said permanent magnets are rare earth alloy magnets comprising iron, neodymium, and boron.

28. The electrical machine according to claim 27 wherein there are twenty four of said magnets, each having a flat pie segment shape covering an arc of about fifteen degrees.

29. The electrical machine according to claim 24 wherein said magnets are rare earth neodymium magnets.

30. The electrical machine according to claim 2 wherein said control means comprises:

a positive and a negative terminal for connecting external circuits to said machine;

a filter network connected between said winding means and said positive terminal;

two silicon controlled rectifiers each having a cathode, an anode, and a gate, each having its cathode connected to said winding means and its anode connected to said negative terminal; and a zero crossover network connected to the gates of said silicon controlled rectifiers for selectively controlling the firing of the two silicon controlled rectifiers into conduction only when the stator voltage is near zero and the voltage at the positive terminal is below a desired level whereby said filter network and said zero crossover network cooperate to provide and maintain a constant desired voltage level between said positive and negative terminals.

31. The electrical machine according to claim 30 wherein said zero crossover network comprises a pair of opto-isolator triac drivers connected between said gates and an operational amplifier integrator circuit connected between said drivers and said positive terminal whereby said drivers cause said silicon controlled retifiers to conduct only when the output of said integrator is high and the voltage of said winding means is near zero.

* * * * *